(12) United States Patent
Brown

(10) Patent No.: US 7,864,197 B2
(45) Date of Patent: Jan. 4, 2011

(54) METHOD OF BACKGROUND COLOUR REMOVAL FOR PORTER AND DUFF COMPOSITING

(75) Inventor: Craig Matthew Brown, Harbord (AU)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 10/525,417

(22) PCT Filed: Oct. 29, 2003

(86) PCT No.: PCT/AU03/01427

§ 371 (c)(1), (2), (4) Date: Sep. 20, 2005

(87) PCT Pub. No.: WO2004/040514

PCT Pub. Date: May 13, 2004

(65) Prior Publication Data

US 2006/0103671 A1    May 18, 2006

(30) Foreign Application Priority Data

Oct. 30, 2002 (AU) .............................. 2002952382

(51) Int. Cl.
*G09G 5/00* (2006.01)
*G09G 5/02* (2006.01)
(52) U.S. Cl. ...................... 345/629; 345/592
(58) Field of Classification Search ................ 345/592, 345/629
See application file for complete search history.

(56) References Cited

U.S. PATENT DOCUMENTS 5,917,937 A * 6/1999 Szeliski et al. ............. 382/154

| 6,014,147 A | 1/2000 | Politis et al. ............. 345/435 |
| 6,028,583 A | 2/2000 | Hamburg ................. 345/112 |

(Continued)

FOREIGN PATENT DOCUMENTS

EP    0 924 652 A2    6/1999

(Continued)

OTHER PUBLICATIONS

Adobe PDF 1.4 Specification—Additional Pages, Dec. 2001, Addison-Wesley, pp. 1-3, 23, 77, and 705.*

(Continued)

*Primary Examiner*—Xiao M Wu
*Assistant Examiner*—David T Welch
(74) *Attorney, Agent, or Firm*—Fitzpatrick, Cella, Harper & Scinto

(57) ABSTRACT

A method of representing an amount of image color in a composite image includes the steps of generating at least one additional opacity channel for use in creating the composite image, and compositing at least one graphical object having object color and object capacity, with an image having image opacity and the image color, to create the composite image. The composite image has composite image color and composite image opacity, and the composite image color and composite image opacity are derived from one or more of the object color, the object opacity, the image color and the image opacity. An additional step includes compositing the object opacity with the additional opacity channel to create an updated opacity channel, with the updated opacity channel representing an amount of the image color remaining in the composite image following the compositing of the at least one graphical object with the image.

24 Claims, 14 Drawing Sheets

U.S. PATENT DOCUMENTS

| | | | | |
|---|---|---|---|---|
| 6,034,694 | A | 3/2000 | Evans et al. | 345/433 |
| 6,115,049 | A | 9/2000 | Winner et al. | 345/432 |
| 6,130,676 | A * | 10/2000 | Wise et al. | 345/619 |
| 6,289,364 | B1 | 9/2001 | Borg et al. | 707/526 |
| 6,301,382 | B1 * | 10/2001 | Smith et al. | 382/162 |
| 6,483,519 | B1 * | 11/2002 | Long et al. | 345/619 |
| 6,532,022 | B1 * | 3/2003 | Ahmad | 345/629 |
| 6,741,261 | B2 | 5/2004 | Chen | 345/592 |
| 6,828,985 | B1 | 12/2004 | Long et al. | 345/620 |
| 6,903,738 | B2 * | 6/2005 | Pfister et al. | 345/420 |
| 7,046,253 | B2 | 5/2006 | Long et al. | 345/591 |
| 7,102,651 | B1 | 9/2006 | Louveaux et al. | 345/629 |
| 7,151,546 | B1 | 12/2006 | Louveaux | 345/619 |
| 7,277,102 | B2 | 10/2007 | Moore | 345/629 |
| 2002/0027563 | A1 * | 3/2002 | Van Doan et al. | 345/630 |
| 2002/0149600 | A1 | 10/2002 | Van Splunter et al. | 345/592 |
| 2003/0189568 | A1 * | 10/2003 | Alkouh | 345/422 |
| 2003/0193508 | A1 | 10/2003 | Graham | 345/581 |

FOREIGN PATENT DOCUMENTS

| | | |
|---|---|---|
| EP | 0 924 654 | 6/1999 |
| JP | 2000-149035 | 5/2000 |
| JP | 2001-209819 | 8/2001 |
| JP | 2001-283213 | 10/2001 |
| JP | 2002-056396 | 2/2002 |

OTHER PUBLICATIONS

Adobe PDF 1.4 Specification—Additional Pages, Dec. 2001, Addison-Wesley, pp. 131-133.*

Alvy Ray Smith, "Paint", Computer Graphics Lab, New York Institute of Technology, Technical Memo No. 7, Jul. 20, 1978 (pp. 1-24).

Alvy Ray Smith, "Tint Fill," ACM Journal, Computer Graphics Lab, New York Institute of Technology (pp. 276-283), 1979.

Chapter 7, Adobe PDF 1.4 Specification (pp. 409-470), Dec. 2001 (http://partners.adobe.com/asn/developer/acrosdk/docs/filefmtspecs/PDFReference.zip).

"Current Support for SVG Adobe SVG Viewer", Version 3.0 (Build 76), 2001 (http://www.adobe.com/svg/indepth/pdfs/CurrentSupport.pdf).

"Clipping, Masking and Compositing", SVG 1.1, Chapter 14 (pp. 1-29), Mar. 25, 2002, (http://lists.w3.org/Archives/Member/w3c-archive/2002Mar/0051.html).

Thomas Porter et al., "Compositing Digital Images", Computer Graphics (vol. 18, No. 3, Jul. 1984), pp. 253-259.

Japanese Office Action dated Mar. 16, 2009, in related corresponding Japanese Patent Appln. No. 2004-547278.

James D. Foley, et al., "Computer Graphics: Theory and Practice" (1st Ed.), pp. 830-839, 17.6 Image compositing, (Mar. 23, 2001).

European Search Report dated Jul. 6, 2009, in related corresponding EP 03 76 9035.

Ola Andersson, et al., "Scalable Vector Graphics (SVG) 1.1 Specification—W3C Candidate Recommendation", Apr. 30, 2002, Sections 14.15 and 15.12.

Jonathan Knudsen, "Java 2D Graphics", O'Reilly Media, Inc., May 5, 1999, Section 5.2.3.

Ola Andersson, et al., "Scalable Vector Graphics (SVG) 1.2 Specification—W3C Working Draft", Oct. 27, 2004, Section 10.1.4.

Craig Northway, "Understand Compositing and Color Extensions in SVG 1.2 in 30 minutes!", Jun. 29, 2009, Sections 8 and 9.

Ola Andersson, et al., "Scalable Vector Graphics (SVG) 1.2—W3C Working Draft", Nov. 15, 2002, Section 4.1.

European Search Report dated Apr. 12, 2009, in related corresponding EP 03 769 035.1.

* cited by examiner

METHOD OF BACKGROUND COLOUR REMOVAL FOR PORTER AND DUFF COMPOSITING

FIELD OF THE INVENTION

The present invention relates generally to the rendering of graphical objects and, in particular, to a method and apparatus for compositing a group of graphical objects using background colour removal, and to a computer program product including a computer readable medium having recorded thereon a computer program for compositing a group of graphical objects using background colour removal.

BACKGROUND

Many computer implemented graphical rendering systems have been developed in order to allow for the creation of graphical images comprising a combination of graphical objects. A typical graphical rendering system accepts a number of input graphical objects and combines the objects to produce a resultant image. Such systems typically store software coded descriptions of graphical objects displayed on a page, using a "Page Description Language ('PDL')". A PDL describes each such graphical object including the attributes of each object. Such attributes include the size, shape and colour of each object. A PDL also describes various other attributes of graphical objects such as the opacity (i.e., alpha channel) associated with an object and the compositing operation used to draw the object, as will be discussed below.

Graphical rendering systems are typically configured to combine graphical objects described in a PDL in order to create various formats of output. For example, the output of a graphical rendering system can include a bitmap or rendering commands sent directly to an output system renderer. Many rendering systems perform such a combination of objects by placing the objects, one at a time, into a destination bitmap. As each object is placed into the destination bitmap, a resultant destination bitmap is generated that contains any previously drawn objects plus the object most recently placed in the bitmap. This result is then in turn used as the input for placing further objects. Some rendering systems may generate the final result of a compositing operation for a single pixel at a time, or for a group of pixels by combining each of the objects in an image multiple times, rather than once.

The attributes of each input object determine the effect that an object has on a final image. The ordering of objects is also important in that each object is placed into the resultant bitmap in turn, where later objects may partially or completely obscure earlier objects. Where a PDL describes a plurality of overlapping objects, the objects are typically rendered sequentially on a page, where each subsequent object may partially or completely obscure preceding objects. For example, FIG. 1(a) shows an image 100 resulting from the rendering of three objects A, B and C. FIG. 1(b) shows the operations involved during the rendering of the objects A, B and C. As seen in FIG. 1(b), initially object B is rendered OVER object A to produce the image 103. Then object C is rendered OVER the objects A and B to produce the image 100 shown in FIG. 1(a). As object C was the final object to be rendered, object C completely obscures objects A and B in a region 101 where object C overlaps objects A and B. The process of rendering objects one on top of another in this manner is conventionally know as the "Painter's Algorithm".

Input and output colour information of a graphical rendering system is typically described in terms of an intensity value associated with each colour component of a pixel. For example, for conventional 24 bit Red, Green, and Blue ('RGB') colour pixel format, each of the Red, Green and Blue colour components of a pixel is represented by an 8 bit (or byte) value. The value of each of the bytes represents the intensity of a particular colour component (i.e., Red, Green or Blue). Further, each 24 bit pixel has an associated opacity value (i.e., alpha channel) ranging between 0% opacity and 100% opacity. An opacity value of 0% indicates that a pixel is completely transparent whilst an opacity value of 100% indicates that the pixel is completely opaque.

Opacity values allow for a plurality of objects to be placed one on top of another to produce a resultant image, where one or more of the objects may be partially obscured by one or more other transparent objects. The operation of combining objects using opacity values is referred to as compositing. For example, a partially opaque object representing a piece of tinted glass can be placed OVER one or more other objects to produce a resultant image. In order to produce the resultant image, a graphics rendering system combines the colour and opacity values representing the glass with the colour and opacity values of the other objects. The image produced by this combination depicts the other objects as seen through the tinted glass.

As another example of rendering objects using opacity values, FIG. 2(a) shows a partially opaque object F (e.g. having an opacity value of 50%) composited onto a completely opaque object E (i.e., having an opacity value of 100%) to produce a resultant image 200. Again, FIG. 2(b) shows the operations involved during the rendering of the objects E and F. In a region 201 of the image 200, where object F overlaps object E, the resultant pixel values represent the combination of object E and object F.

More recently, graphical rendering systems have mathematically extended the Painter's Algorithim process to include operations such as intersecting objects or colour combinations. Such operations can give the effect of intersecting objects or of shining a light onto an object. For example, FIG. 3(a) shows the object F composited onto the object E to produce an image 300, where object E is completely opaque and object F is partially opaque. FIG. 3(b) shows the operations involved during the rendering of the objects E and F, where the compositing operation used to produce the image 300 is an intersection (IN) operation.

FIG. 18 shows the result of each of the above compositing operators together with a variety of other conventional compositing operators, which are conventionally known as "Porter-Duff Compositing Operators".

Graphical rendering systems can also be configured to combine objects into a group before processing. Generally, such groups of objects are processed as though the objects of the group are joined to produce a single object. The single object can then be placed onto a background image. Objects grouped in such a manner can have operations applied to the group as a whole after all group member objects are combined and before the group is placed on the background image.

FIG. 4(a) shows the result of rendering three objects A, B and C to produce the same image 100 seen in FIG. 1(a). However, as shown in FIG. 4(b), in this instance the objects B and C are initially combined to form group X. Group X is then composited onto object A to produce the resultant image 100.

In an extension of the example of FIG. 4(a), each of the objects within a group (e.g. the group X) can be drawn onto a background image (e.g. object A) using a different compositing operation. For example, different objects of a group may be intersected with a background image or may act as a lighting condition on the background image. The technique of initially combining objects to produce a single object, then placing the combined result on a background is not suitable when objects are grouped together to form a single object (e.g. group X). Such a technique is not suitable as the operations associated with each of the individual objects of a group and which are required to be performed to separately combine each object with the background image, are not performed if the objects are grouped.

As an example, FIG. 5(a) shows an image 501 resulting from the compositing of an object E onto an object A, using an OVER operator. An object F is then composited onto the image 501 using an intersection (IN) operator to produce the image 500 shown in FIG. 5(b). The compositing expression for the image 500 is, therefore, (F IN (E OVER A)).

In contrast, FIG. 6(a) shows the operations involved in the rendering of the objects E, A and F, where objects E and F are initially grouped together to produce group Y. The compositing expression for the image 600 is ((F IN E) OVER A). The operations of FIG. 6(a) produce an image 600 shown in FIG. 6(b). As can be seen from a comparison of FIGS. 5(b) and 6(b), due to the different association of the objects A, E and F, the image 500 is different to the image 600. The grouping of the objects E and F results in the operation (F OVER A) not being performed in producing the image 600.

To render a grouped plurality of objects onto a background image, a conventional rendering system typically takes a copy of the background image and then renders each of the objects in the group onto the copy. Such a rendering system then calculates the percentage of background colour in the resultant image copy and removes this background colour from the image copy. The rendering system then applies operations to the group as a whole. The result of such operations is then composited onto the original background using conventional blending operations.

Where one object of a group of objects, adds colour and opacity to a background image, conventional rendering systems using the above process produce an aesthetically satisfactory result for certain conventional compositing operations (i.e., OVER, ATOP, ROVER, Multiply and Plus). However, where one object of such a group removes colour or opacity data from the background image, conventional rendering systems are unable to satisfactorily remove the background image colour from the representation of the group composited onto the background. As such, a group of objects cannot be composited as a whole onto a background image in order to produce an aesthetically satisfactory result for all compositing operations.

Thus, a need clearly exists for a method of compositing graphical objects, which allows a grouped plurality of objects to be composited onto a background image for substantially all compositing operations.

SUMMARY

It is an object of the present invention to substantially overcome, or at least ameliorate, one or more disadvantages of existing arrangements.

According to one aspect of the present invention there is provided a method of compositing at least one graphical object with an image, said object and said image having associated colour and opacity component values, said method comprising the steps of:

generating at least one opacity channel having associated opacity component values;

compositing the colour and opacity component values of said at least one object with the colour and opacity component values of said image; and compositing said opacity component values of said at least one object with that of said at least one opacity channel to produce an altered opacity channel, said altered opacity channel thereby representing the opacity component values associated with said image remaining in said image following composition with said colour and opacity components of said at least one object.

According to another aspect of the present invention there is provided a method of compositing at least one graphical object with an image, said object and said image having associated colour and opacity component values, said method comprising the steps of:

generating at least one opacity channel having associated opacity component values;

compositing the colour and opacity component values of said at least one object with the colour and opacity component values of said image;

compositing said opacity component values of said at least one object with that of said at least one opacity channel to produce an altered opacity channel; and utilising said altered opacity channel to remove the colour and opacity component values of said image remaining in said image following composition with said colour and opacity component values of said at least one object.

According to still another aspect of the present invention there is provided a method of compositing a grouped plurality of graphical objects with an image, each said object and said image having associated colour and opacity component values, said method comprising the steps of:

generating at least one opacity channel having associated opacity component values;

compositing the colour and opacity component values of each of said objects with the colour and opacity component values of said image;

compositing said opacity component values of each of said objects with that of said at least one opacity channel to produce an altered opacity channel; and utilising said altered opacity channel to remove the colour and opacity component values of said image remaining in said image following composition with the colour and opacity component values of each of said objects.

According to still another aspect of the present invention there is provided an apparatus for compositing at least one graphical object with an image, said object and said image having associated colour and opacity component values, said apparatus comprising:

means for generating at least one opacity channel having associated opacity component values;

means for compositing the colour and opacity component values of said at least one object with the colour and opacity component values of said image; and means for compositing said opacity component values of said at least one object with that of said at least one opacity channel to produce an altered opacity channel, said altered opacity channel thereby representing the opacity component values associated with said image remaining in said image following composition with said colour and opacity components of said at least one object.

According to still another aspect of the present invention there is provided an apparatus for compositing at least one graphical object with an image, said object and said image having associated colour and opacity component values, said apparatus comprising:

means for generating at least one opacity channel having associated opacity component values;

means for compositing the colour and opacity component values of said at least one object with the colour and opacity component values of said image;

means for compositing said opacity component values of said at least one object with that of said at least one opacity channel to produce an altered opacity channel; and utilising said altered opacity channel to remove the colour and opacity component values of said image remaining in said image following composition with said colour and opacity component values of said at least one object.

According to still another aspect of the present invention there is provided an apparatus for compositing a grouped plurality of graphical objects with an image, each said object and said image having associated colour and opacity component values, said apparatus comprising:

means for generating at least one opacity channel having associated opacity component values;

means for compositing the colour and opacity component values of each of said objects with the colour and opacity component values of said image;

means for compositing said opacity component values of each of said objects with that of said at least one opacity channel to produce an altered opacity channel; and utilising said altered opacity channel to remove the colour and opacity component values of said image remaining in said image following composition with the colour and opacity component values of each of said objects.

According to still another aspect of the present invention there is provided an apparatus for compositing at least one graphical object with an image, said object and said image having associated colour and opacity component values, said apparatus comprising:

a memory for storing a program; and a processor for executing said program, said program comprising:

code for generating at least one opacity channel having associated opacity component values;

code for compositing the colour and opacity component values of said at least one object with the colour and opacity component values of said image; and code for compositing said opacity component values of said at least one object with that of said at least one opacity channel to produce an altered opacity channel, said altered opacity channel thereby representing the opacity component values associated with said image remaining in said image following composition with said colour and opacity components of said at least one object.

According to still another aspect of the present invention there is provided an apparatus for compositing at least one graphical object with an image, said object and said image having associated colour and opacity component values, said apparatus comprising:

a memory for storing a program; and a processor for executing said program, said program comprising:

code for generating at least one opacity channel having associated opacity component values;

code for compositing the colour and opacity component values of said at least one object with the colour and opacity component values of said image;

code for compositing said opacity component values of said at least one object with that of said at least one opacity channel to produce an altered opacity channel; and code for utilising said altered opacity channel to remove the colour and opacity component values of said image remaining in said image following composition with said colour and opacity component values of said at least one object.

According to still another aspect of the present invention there is provided an apparatus for compositing a grouped plurality of graphical objects with an image, each said object and said image having associated colour and opacity component values, said apparatus comprising:

a memory for storing a program; and a processor for executing said program, said program comprising:

code for generating at least one opacity channel having associated opacity component values;

code for compositing the colour and opacity component values of each of said objects with the colour and opacity component values of said image;

code for compositing said opacity component values of each of said objects with that of said at least one opacity channel to produce an altered opacity channel; and code for utilising said altered opacity channel to remove the colour and opacity component values of said image remaining in said image following composition with the colour and opacity component values of each of said objects.

According to still another aspect of the present invention there is provided a computer program for compositing at least one graphical object with an image, said object and said image having associated colour and opacity component values, said program comprising:

code for generating at least one opacity channel having associated opacity component values;

code for compositing the colour and opacity component values of said at least one object with the colour and opacity component values of said image; and code for compositing said opacity component values of said at least one object with that of said at least one opacity channel to produce an altered opacity channel, said altered opacity channel thereby representing the opacity component values associated with said image remaining in said image following composition with said colour and opacity components of said at least one object.

According to still another aspect of the present invention there is provided a computer program for compositing at least one graphical object with an image, said object and said image having associated colour and opacity component values, said program comprising:

code for generating at least one opacity channel having associated opacity component values;

code for compositing the colour and opacity component values of said at least one object with the colour and opacity component values of said image;

code for compositing said opacity component values of said at least one object with that of said at least one opacity channel to produce an altered opacity channel; and code for utilising said altered opacity channel to remove the colour and opacity component values of said image remaining in said image following composition with said colour and opacity component values of said at least one object.

According to still another aspect of the present invention there is provided a computer program for compositing a grouped plurality of graphical objects with an image, each said object and said image having associated colour and opacity component values, said program comprising:

code for generating at least one opacity channel having associated opacity component values;

code for compositing the colour and opacity component values of each of said objects with the colour and opacity component values of said image;

code for compositing said opacity component values of each of said objects with that of said at least one opacity channel to produce an altered opacity channel; and code for utilising said altered opacity channel to remove the colour and opacity component values of said image remaining in said image following composition with the colour and opacity component values of each of said objects.

According to still another aspect of the present invention there is provided a computer program product having a computer readable medium having a computer program recorded therein for compositing at least one graphical object with an image, said object and said image having associated colour and opacity component values, said computer program product comprising:

computer program code means for generating at least one opacity channel having associated opacity component values;

computer program code means for compositing the colour and opacity component values of said at least one object with the colour and opacity component values of said image; and computer program code means for compositing said opacity component values of said at least one object with that of said at least one opacity channel to produce an altered opacity channel, said altered opacity channel thereby representing the opacity component values associated with said image remaining in said image following composition with said colour and opacity components of said at least one object.

According to still another aspect of the present invention there is provided a computer program product having a computer readable medium having a computer program recorded therein for compositing at least one graphical object with an image, said object and said image having associated colour and opacity component values, said computer program product comprising:

computer program code means for generating at least one opacity channel having associated opacity component values;

computer program code means for compositing the colour and opacity component values of said at least one object with the colour and opacity component values of said image;

computer program code means for compositing said opacity component values of said at least one object with that of said at least one opacity channel to produce an altered opacity channel; and computer program code means for utilising said altered opacity channel to remove the colour and opacity component values of said image remaining in said image following composition with said colour and opacity component values of said at least one object.

According to still another aspect of the present invention there is provided a computer program product having a computer readable medium having a computer program recorded therein for compositing a grouped plurality of graphical objects with an image, each said object and said image having associated colour and opacity component values, said computer program product comprising:

computer program code means for generating at least one opacity channel having associated opacity component values;

computer program code means for compositing the colour and opacity component values of each of said objects with the colour and opacity component values of said image;

computer program code means for compositing said opacity component values of each of said objects with that of said at least one opacity channel to produce an altered opacity channel; and computer program code means for utilising said altered opacity channel to remove the colour and opacity component values of said image remaining in said image following composition with the colour and opacity component values of each of said objects.

Other aspects of the invention are also disclosed.

BRIEF DESCRIPTIONS OF THE DRAWINGS

Some aspects of the prior art and one or more embodiments of the present invention are described with reference to the drawings and appendices, in which.

DETAILED DESCRIPTION INCLUDING BEST MODE

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

A method 700 (see FIG. 7) of compositing a group of graphical objects onto a background image, in accordance with an embodiment of the present invention, is described below with reference to FIGS. 7 to 18. The method 700 allows a grouped plurality of objects to be composited onto a background image to produce the same result as if each of the objects had been rendered separately onto the background image. In particular, the method 700 allows such a composition to be performed when an operation is to be applied to a grouped plurality of objects as a whole.

The principles of the method 700 described herein have general applicability to any rendering system that accepts input graphical objects and generates a final image. The final image may be represented in any suitable format (e.g. pixels or rendering commands). The input objects for such a rendering system can be generated using a graphical user interface, where a user can group a plurality of objects together in order to process the group of objects as a single object (or group object). Such a group object allows any operation (e.g. group opacity or input filtering) that can be performed on a single object to be performed on the group object. Each separate input object of such a rendering system includes an associated compositing operation used to composite the object onto a background image.

Figure 15:
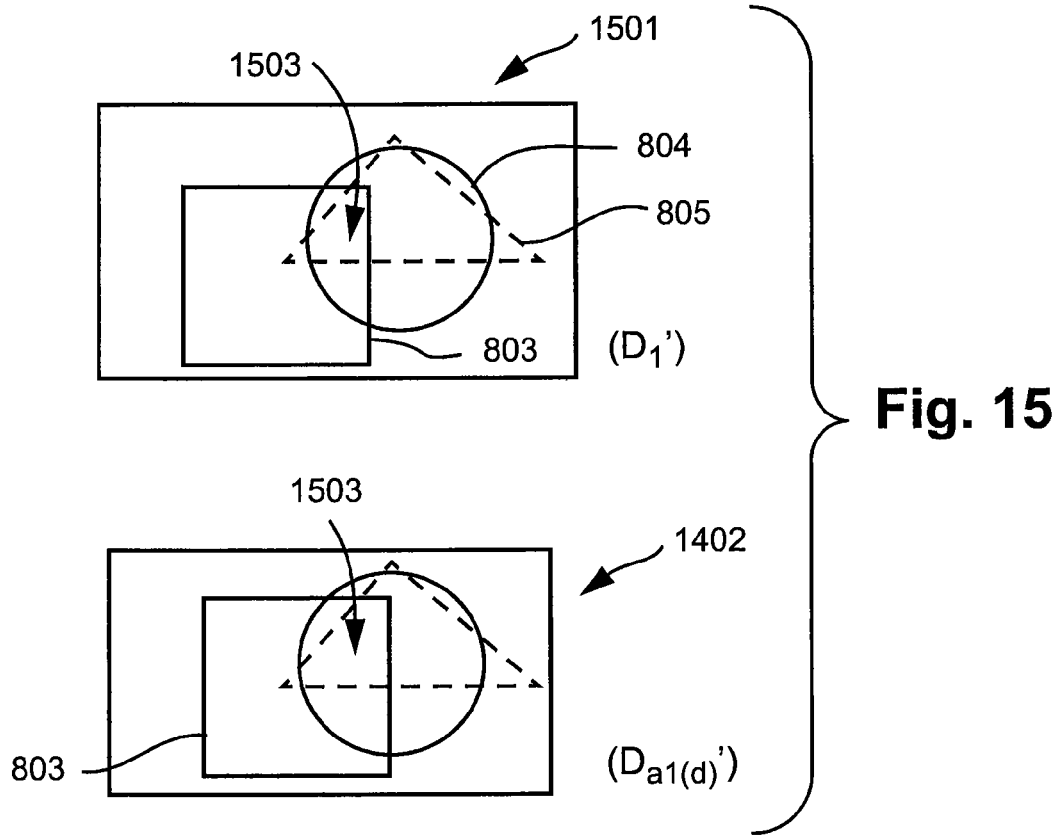
FIG. 15 shows a further updated duplicate background image following the application of group opacity to the updated duplicate background image of FIG. 14.
Figure 16:
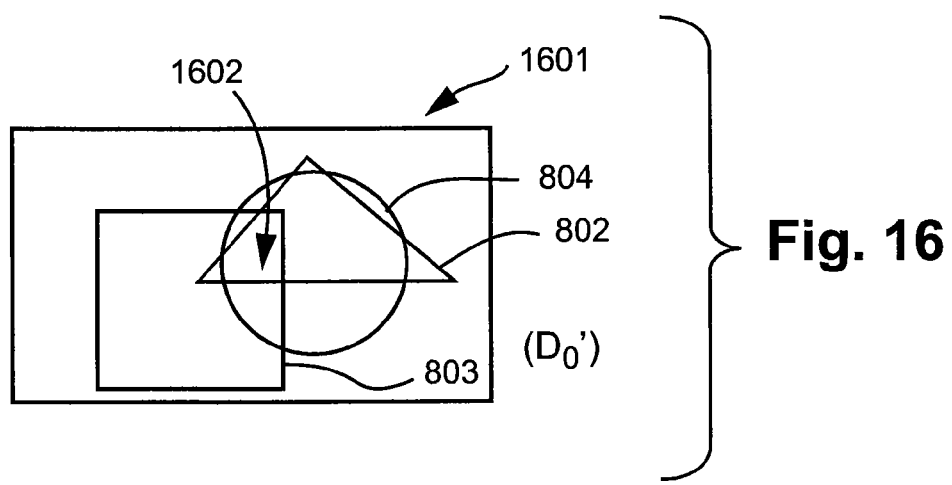
FIG. 16 shows an updated version of the original background image of FIG. 10 following the compositing of the group object of FIG. 8(b)
Figure 17:
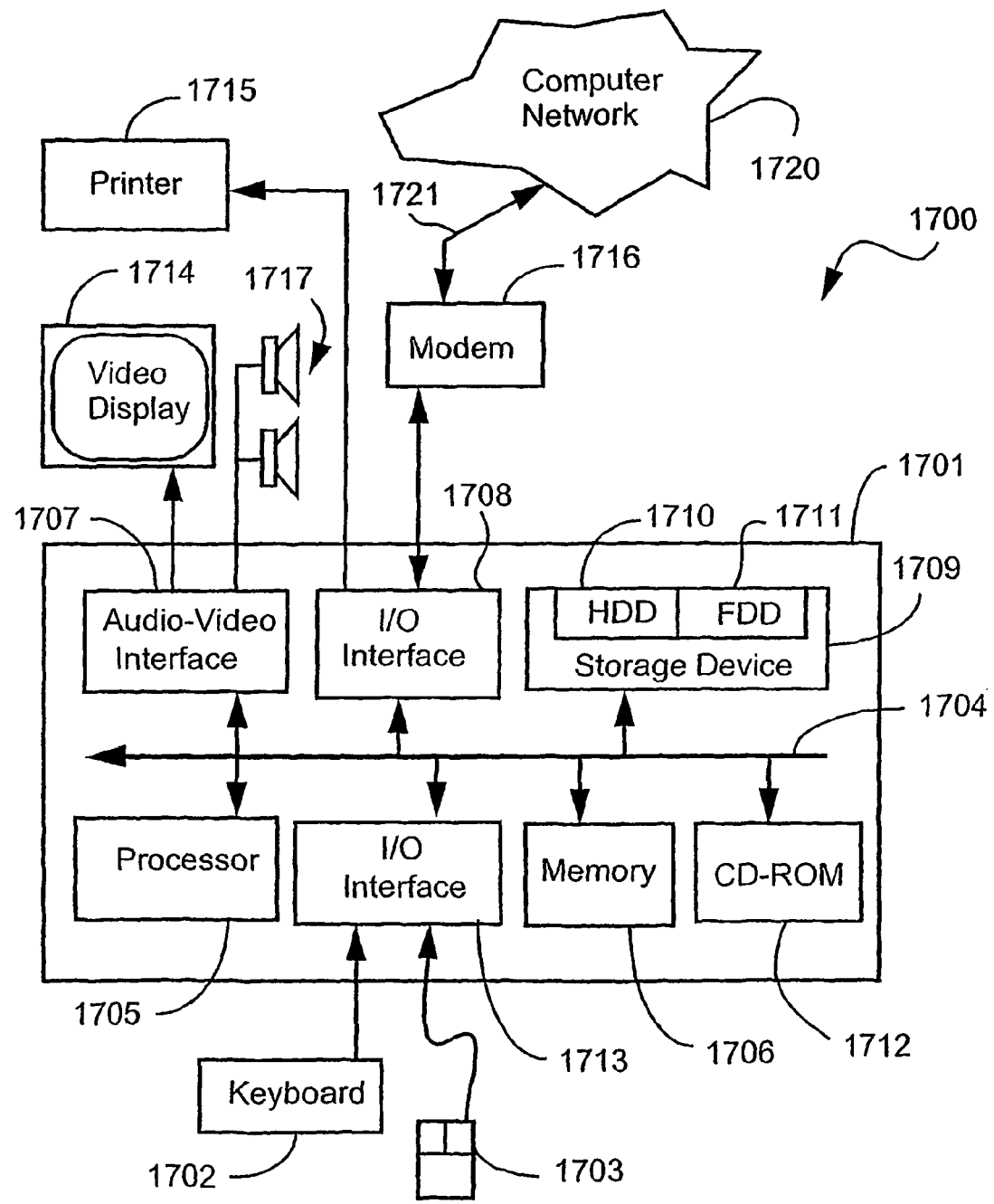
FIG. 17 is a schematic block diagram of a general purpose computer upon which arrangements described can be practiced.
Figure 18:
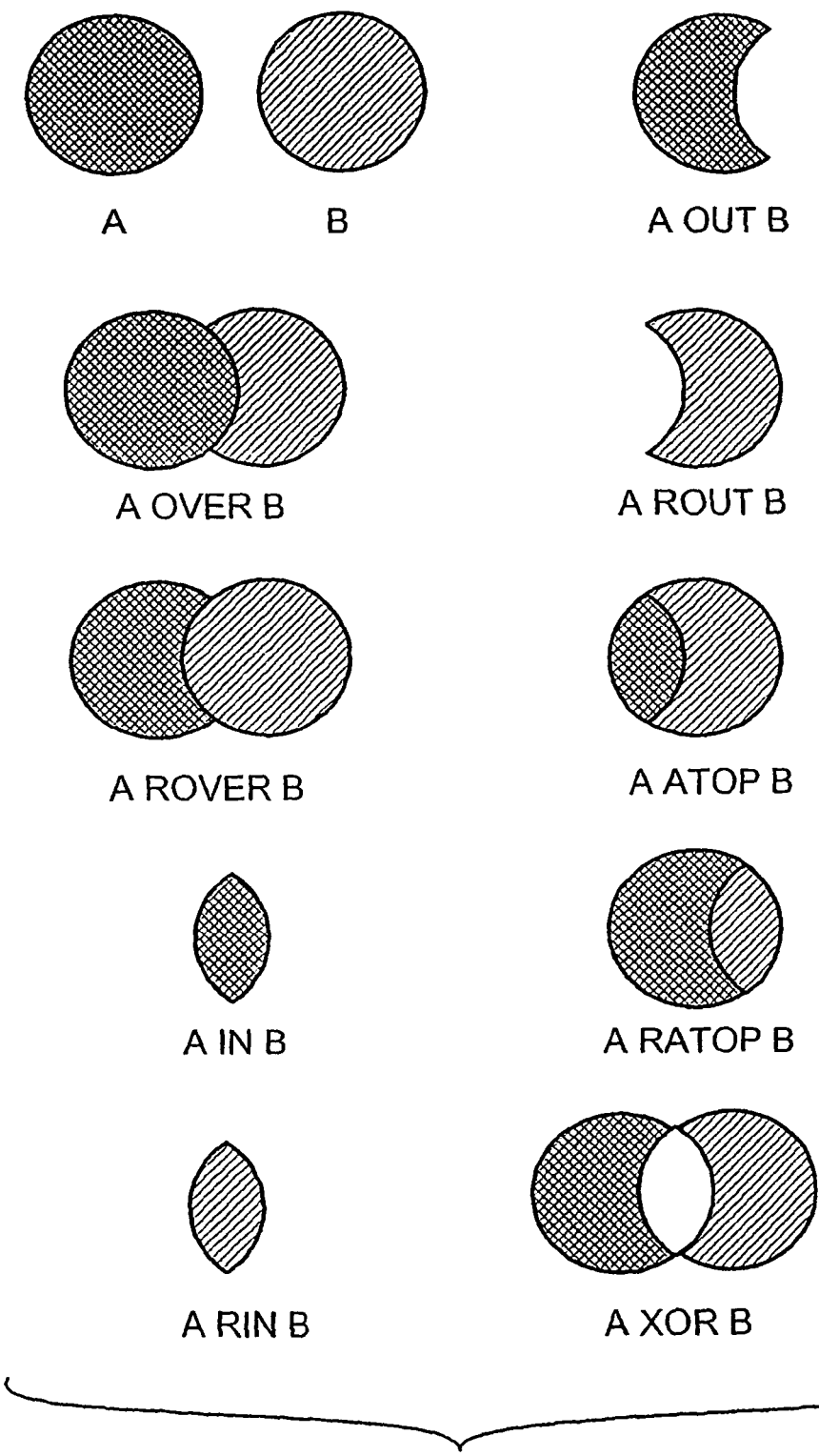
FIG. 18 shows the result of each of the above compositing operators together with a variety of other conventional compositing operators.

The method 700 is preferably practiced using a general-purpose computer system 1700, such as that shown in FIG. 17 wherein the processes of FIGS. 7 to 18 may be implemented as software, such as an application program executing within the computer system 1700. In particular, the steps of method 700 are effected by instructions in the software that are carried out by the computer. The instructions may be formed as one or more code modules, each for performing one or more particular tasks. The software may also be divided into two separate parts, in which a first part performs the method 700 and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementing the method 700.

The computer system 1700 is formed by a computer module 1701, input devices such as a keyboard 1702 and mouse 1703, output devices including a printer 1715, a display device 1714 and loudspeakers 1717. A Modulator-Demodulator (Modem) transceiver device 1716 is used by the computer module 1701 for communicating to and from a communications network 1720, for example connectable via a telephone line 1721 or other functional medium. The modem 1716 can be used to obtain access to the Internet, and other network systems, such as a Local Area Network (LAN) or a Wide Area Network (WAN), and may be incorporated into the computer module 1701 in some implementations.

The computer module 1701 typically includes at least one processor unit 1705, and a memory unit 1706, for example formed from semiconductor random access memory (RAM) and read only memory (ROM). The module 1701 also includes an number of input/output (I/O) interfaces including an audio-video interface 1707 that couples to the video display 1714 and loudspeakers 1717, an I/O interface 1713 for the keyboard 1702 and mouse 1703 and optionally a joystick (not illustrated), and an interface 1708 for the modem 1716 and printer 1715. In some implementations, the modem 1716 may be incorporated within the computer module 1701, for example within the interface 1708. A storage device 1709 is provided and typically includes a hard disk drive 1710 and a floppy disk drive 1711. A magnetic tape drive (not illustrated) may also be used. A CD-ROM drive 1712 is typically provided as a non-volatile source of data. The components 1705 to 1713 of the computer module 1701, typically communicate via an interconnected bus 1704 and in a manner which results in a conventional mode of operation of the computer system 1700 known to those in the relevant art. Examples of computers on which the described arrangements can be practised include IBM-PC's and compatibles, Sun Sparcstations or alike computer systems evolved therefrom.

Typically, the application program is resident on the hard disk drive 1710 and read and controlled in its execution by the processor 1705. Intermediate storage of the program and any data fetched from the network 1720 may be accomplished using the semiconductor memory 1706, possibly in concert with the hard disk drive 1710. In some instances, the application program may be supplied to the user encoded on a CD-ROM or floppy disk and read via the corresponding drive 1712 or 1711, or alternatively may be read by the user from the network 1720 via the modem device 1716. Still further, the software can also be loaded into the computer system 1700 from other computer readable media. The term "computer readable medium" as used herein refers to any storage or transmission medium that participates in providing instructions and/or data to the computer system 1700 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1701. Examples of transmission media include radio or infra-red transmission channels as well as a network connection to another computer or networked device, and the Internet or Intranets including e-mail transmissions and information recorded on Websites and the like.

The method 700 of compositing a group of graphical objects may alternatively be implemented in dedicated hardware such as one or more integrated circuits performing the functions or sub functions of the method 700. Such dedicated hardware may include graphic processors, digital signal processors, or one or more microprocessors and associated memories.

For ease of explanation, compositing operations are generally described below in terms of premultiplied alpha (i.e., opacity), unless otherwise indicated. Many graphical rendering systems store pixel colour component values as pre-multiplied alpha values in order to reduce the complexity of compositing operations. For example, in a Red, Green, Blue, Alpha (RGBA) colour environment, to represent a value of 50% opaque Red as pre-multiplied RGBA, the colour component values stored are R=0.5 (i.e., 100% Red×50% opacity), G=0, B=0, A=0.5.

Table 1 below shows the definition of terms used throughout the following description to represent compositing operations. As shown in Table 1, the term 'S' below is used to refer to a colour component value stored in a source buffer. The term 'D' below is used to refer to a colour component value stored in a destination buffer.

TABLE 1

| Term | Definition |
|---|---|
| $S_c$ | Non-premultiplied source colour component. |
| $S_{ca}$ | Premultiplied source colour component. |
| $S_{ra}, S_{ga}, S_{ba}$ | Premultiplied source colour components for Red, Green and Blue, respectively. |
| $S_a$ | Source opacity component. |
| $D_c$ | Non-premultiplied destination colour component. |
| $D_{ca}$ | Premultiplied destination colour component. |
| $D_{ra}, D_{ga}, D_{ba}$ | Premultiplied destination colour components for Red, Green and Blue, respectively. |
| $D_a$ | Destination opacity component. |
| $D_{a(d)}$ | Destination opacity component for a group buffer containing the opacity of the background channel in the group buffer. |
| $D_{<n>}$ | Destination buffer <n>, where n = 0 represents the background, n = 1 represents groups in a top level object, n = 2 represents nested groups. |
| D' | The result of a destination buffer following a compositing step (i.e., the updated buffer). |

The following equations (1) and (2) are used to determine the result of compositing source pixel values with destination pixel values. A source pixel value may be associated with either a single object or a group of objects represented as a single object. For each pixel, a value is determined using equations (1) and (2) for each colour component (e.g. R, G, B) and for the alpha channel. Depending on the compositing operation to be performed, equations (1) and (2) are resolved in terms of premultiplied alpha values prior to rendering.

$$D_{ca}' = f(S_c, D_c) \cdot S_a \cdot D_a + Y \cdot S_{ca} \cdot (1-D_a) + Z \cdot D_{ca} \cdot (1-S_a) \tag{1}$$

$$D_a' = X \cdot S_a \cdot D_a + Y \cdot S_a \cdot (1-D_a) + Z \cdot D_a \cdot (1-S_a) \tag{2}$$

where:

X: represents the intersection of the opacity of a source pixel value and a destination pixel value;

Y: represents the intersection of the source pixel value and the inverse of the destination pixel value;

Z: represents the intersection of the inverse of the source pixel value and the destination pixel value; and f( ): represents a function of the source and destination colour component values as defined by the particular compositing operator used to perform the operation (see Table 2 below).

Table 2 defines some compositing operations in terms of X, Y, Z and f( ). A person skilled in the relevant art would appreciate that other compositing operations known in the relevant art can be defined in a similar fashion. Table 2 also includes a column, Colour ($D_{ca}'$), indicating an equation for determining the destination colour component value for a particular compositing operation (e.g. source pixel OVER destination pixel). Table 2 also includes a column, $D_a'$, showing an equation for determining the destination opacity component value, and a column $D_{a(d)}'$ showing an equation for determining the destination opacity component value for a group buffer containing the opacity of the background channel in the group buffer.

TABLE 2

| Operation | $f(S_c, D_c)$ | X | Y | Z | Colour ($D_{ca}'$) | Opacity ($D_a'$) | $D_{a(d)}'$ |
|---|---|---|---|---|---|---|---|
| Clear | 0 | 0 | 0 | 0 | 0 | 0 | 0 |
| Src | $S_c$ | 1 | 1 | 0 | $S_c \cdot S_a \cdot D_a +$ $S_{ca} \cdot (1-D_a) =$ $S_{ca}$ | $S_a \cdot D_a +$ $S_a \cdot (1-D_a) =$ $S_a$ | 0 |
| Dst | $D_c$ | 1 | 0 | 1 | $D_c \cdot S_a \cdot D_a +$ $D_{ca} \cdot (1-S_a) =$ $D_{ca}$ | $S_a \cdot D_a +$ $D_a \cdot (1-S_a) =$ $D_a$ | $D_{a(d)} \cdot (1-S_a)$ |
| OVER | $S_c$ | 1 | 1 | 1 | $S_c \cdot S_a \cdot D_a +$ $S_{ca} \cdot (1-D_a) +$ $D_{ca} \cdot (1-S_a) =$ $S_{ca} + D_{ca} \cdot (1-S_a)$ | $S_a \cdot D_a +$ $S_a \cdot (1-D_a) +$ $D_a \cdot (1-S_a) =$ $S_a + D_a - S_a \cdot D_a$ | $D_{a(d)} \cdot (1-S_a)$ |
| ROVER | $D_c$ | 1 | 1 | 1 | $D_c \cdot S_a \cdot D_a +$ $S_{ca} \cdot (1-D_a) +$ $D_{ca} \cdot (1-S_a) =$ $D_{ca} + S_{ca} \cdot (1-D_a)$ | $S_a \cdot D_a +$ $S_a \cdot (1-D_a) +$ $D_a \cdot (1-S_a) =$ $S_a + D_a - S_a \cdot D_a$ | $D_{a(d)} \cdot (1-S_a)$ |
| IN | $S_c$ | 1 | 0 | 0 | $S_c \cdot S_a \cdot D_a$ | $S_a \cdot D_a$ | 0 |
| RIN | $D_c$ | 1 | 0 | 0 | $D_c \cdot S_a \cdot D_a$ | $S_a \cdot D_a$ | 0 |
| OUT | 0 | 0 | 1 | 0 | $S_{ca} \cdot (1-D_a)$ | $S_a \cdot (1-D_a)$ | 0 |
| ROUT | 0 | 0 | 0 | 1 | $D_{ca} \cdot (1-S_a)$ | $D_a \cdot (1-S_a)$ | $D_{a(d)} \cdot (1-S_a)$ |
| ATOP | $S_c$ | 1 | 0 | 1 | $S_c \cdot S_a \cdot D_a +$ $D_{ca} \cdot (1-S_a) =$ $S_{ca} \cdot D_a + D_{ca} \cdot (1-S_a)$ | $S_a \cdot D_a +$ $D_a \cdot (1-S_a) =$ $D_a$ | $D_{a(d)} \cdot (1-S_a)$ |

TABLE 2-continued

| Operation | $f(S_c, D_c)$ | X | Y | Z | Colour ($D_{ca}'$) | Opacity ($D_a'$) | $D_{a(d)}'$ |
|---|---|---|---|---|---|---|---|
| RATOP | $D_c$ | 1 | | | $D_c \cdot S_a \cdot D_a +$ | $S_a \cdot D_a +$ | 0 |
| | | | 1 | | $S_{ca} \cdot (1 - D_a) =$ | $S_a \cdot (1 - D_a) =$ | |
| | | | | 0 | $D_{ca} \cdot S_a + S_{ca} \cdot (1 - D_a)$ | $S_a$ | |
| XOR | 0 | 0 | | | $S_{ca} \cdot (1 - D_a) +$ | $S_a \cdot (1 - D_a) +$ | $D_{a(d)} \cdot (1 - S_a)$ |
| | | | 1 | | $D_{ca} \cdot (1 - S_a) =$ | $D_a \cdot (1 - S_a) =$ | |
| | | | | 1 | $S_{ca} \cdot (1 - D_a) + D_{ca} \cdot (1 - S_a)$ | $S_a + D_a - 2 \cdot S_a \cdot D_a$ | |
| Plus | $S_c + D_c$ | 1 | | | $(S_c + D_c) \cdot S_a \cdot D_a$ | $S_a \cdot D_a$ | $D_{a(d)} \cdot (1 - S_a)$ |
| | | | 1 | | $S_{ca} \cdot (1 - D_a) +$ | $S_a \cdot (1 - D_a) +$ | |
| | | | | 1 | $D_{ca} \cdot (1 - S_a) =$ | $D_a \cdot (1 - S_a) =$ | |
| | | | | | $S_{ca} + D_{ca}$ | $S_a + D_a - S_a \cdot D_a$ | |
| Multiply | $S_c \cdot D_c$ | 1 | | | $S_c \cdot D_c \cdot S_a \cdot D_a$ | $S_a \cdot D_a$ | $D_{a(d)} \cdot (1 - S_a)$ |
| | | | 1 | | $S_{ca} \cdot (1 - D_a) +$ | $S_a \cdot (1 - D_a) +$ | |
| | | | | 1 | $D_{ca} \cdot (1 - S_a) =$ | $D_a \cdot (1 - S_a) =$ | |
| | | | | | $S_{ca} \cdot D_{ca} + S_{ca} \cdot (1 - D_a) + D_{ca} \cdot (1 - S_a)$ | $S_a + D_a - S_a \cdot D_a$ | |

Figure 1A:
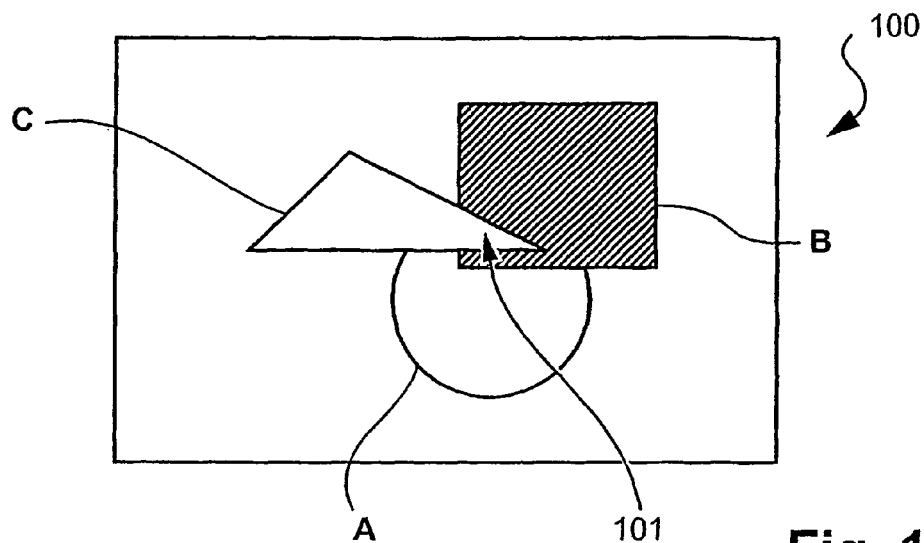
FIG. 1(a) shows an image resulting from the rendering of three objects.
Figure 1B:
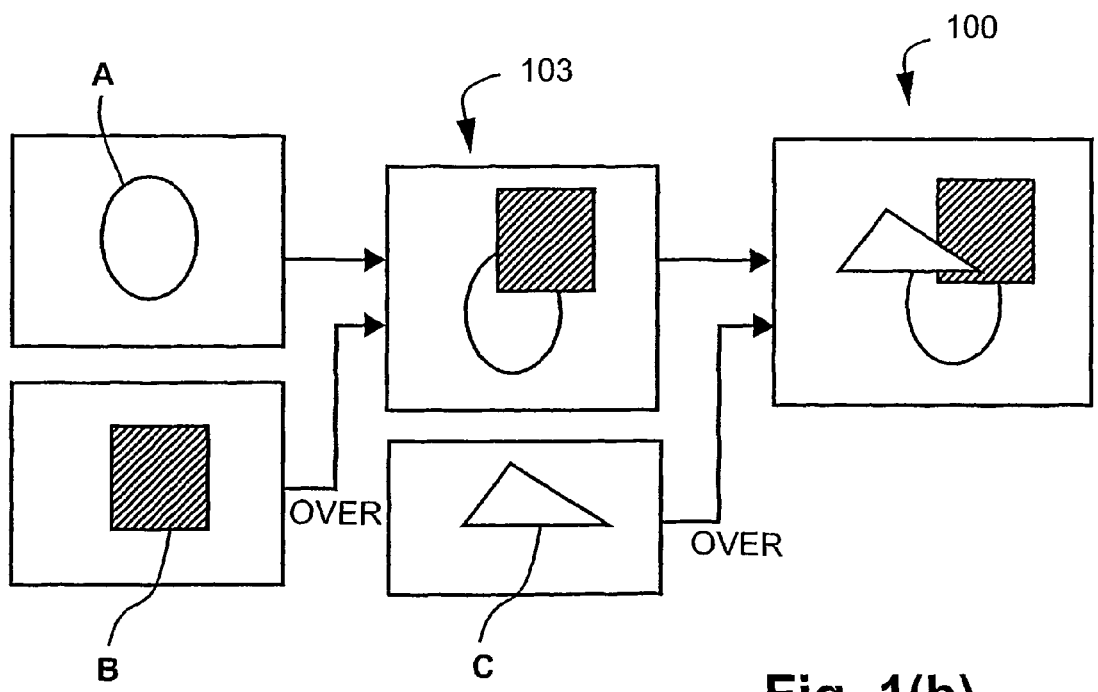
FIG. 1(b) shows the operations involved during the rendering of the objects of FIG. 1(a)
Figure 2A:
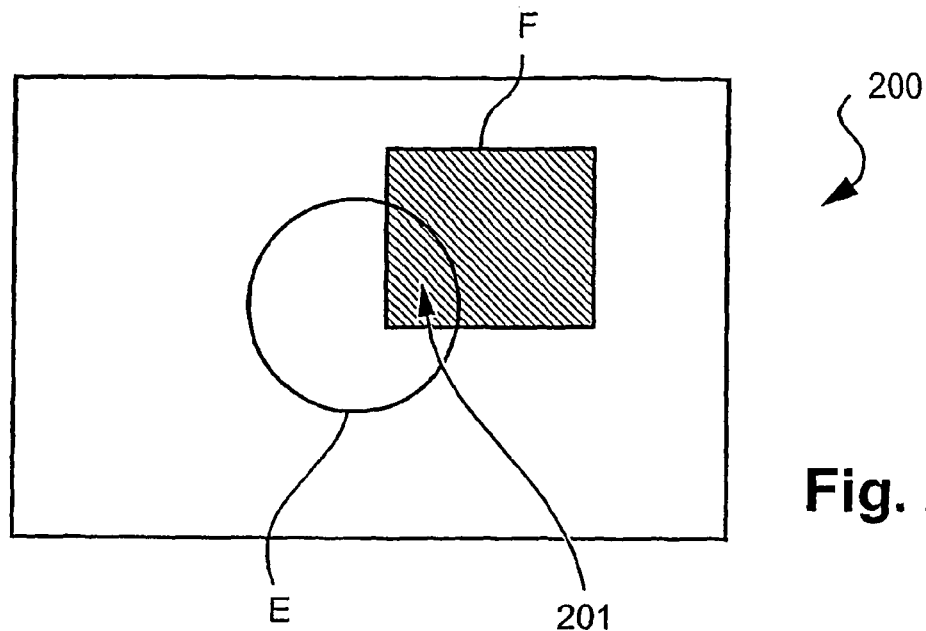
FIG. 2(a) shows a partially opaque object composited onto a completely opaque object.
Figure 2B:
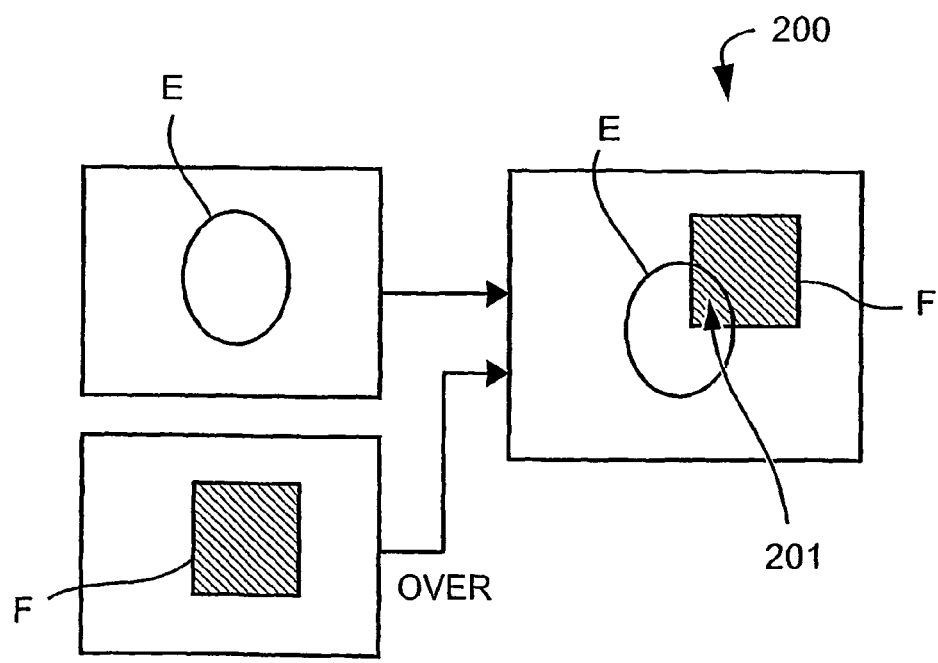
FIG. 2(b) shows the operations involved during the rendering of the objects of FIG. 2(a)
Figure 3A:
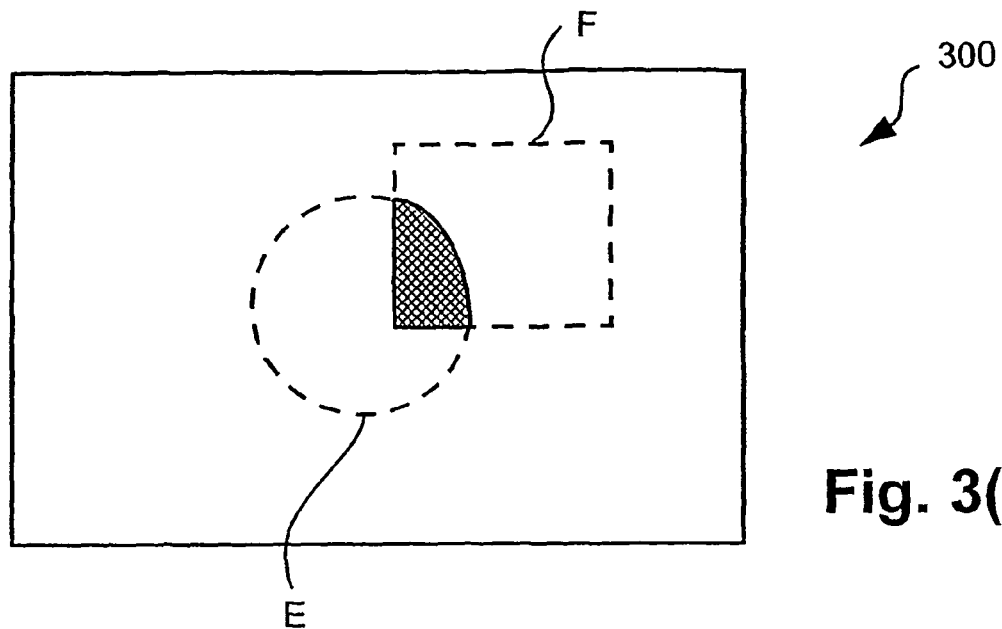
FIG. 3(a) shows an object composited onto another object.
Figure 3B:
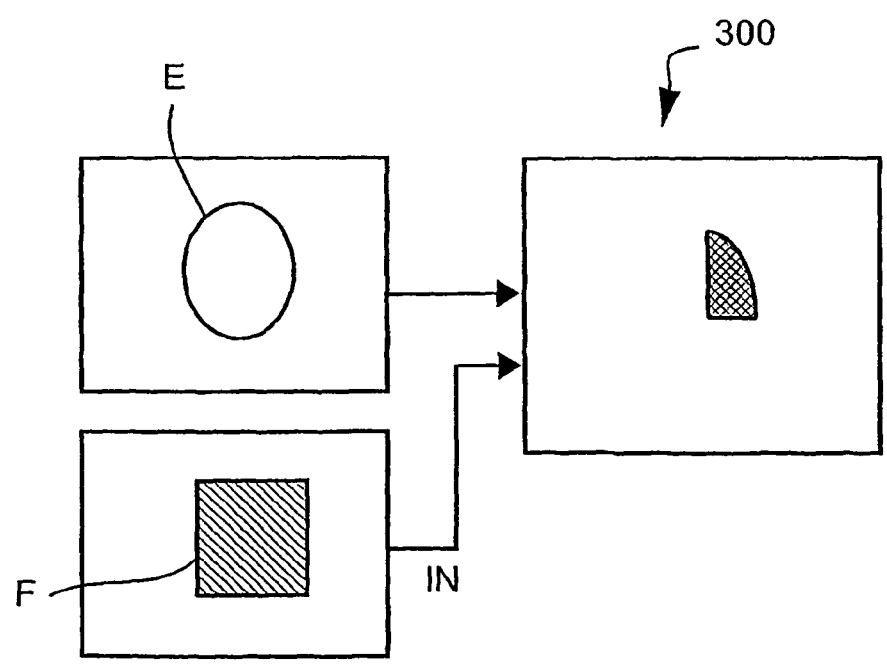
FIG. 3(b) shows the operations involved during the rendering of the objects of FIG. 3(a)
Figure 4A:
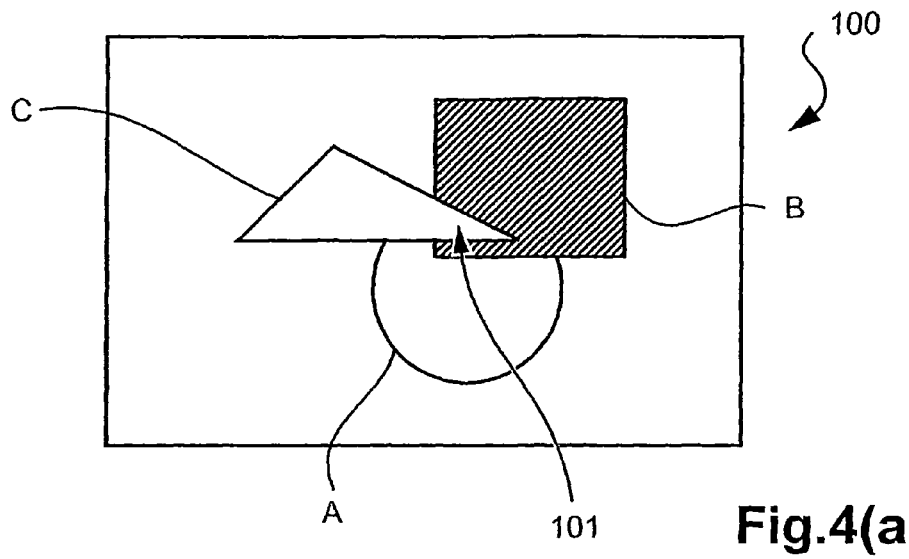
FIG. 4(a) shows an image resulting from the rendering of three objects.
Figure 4B:
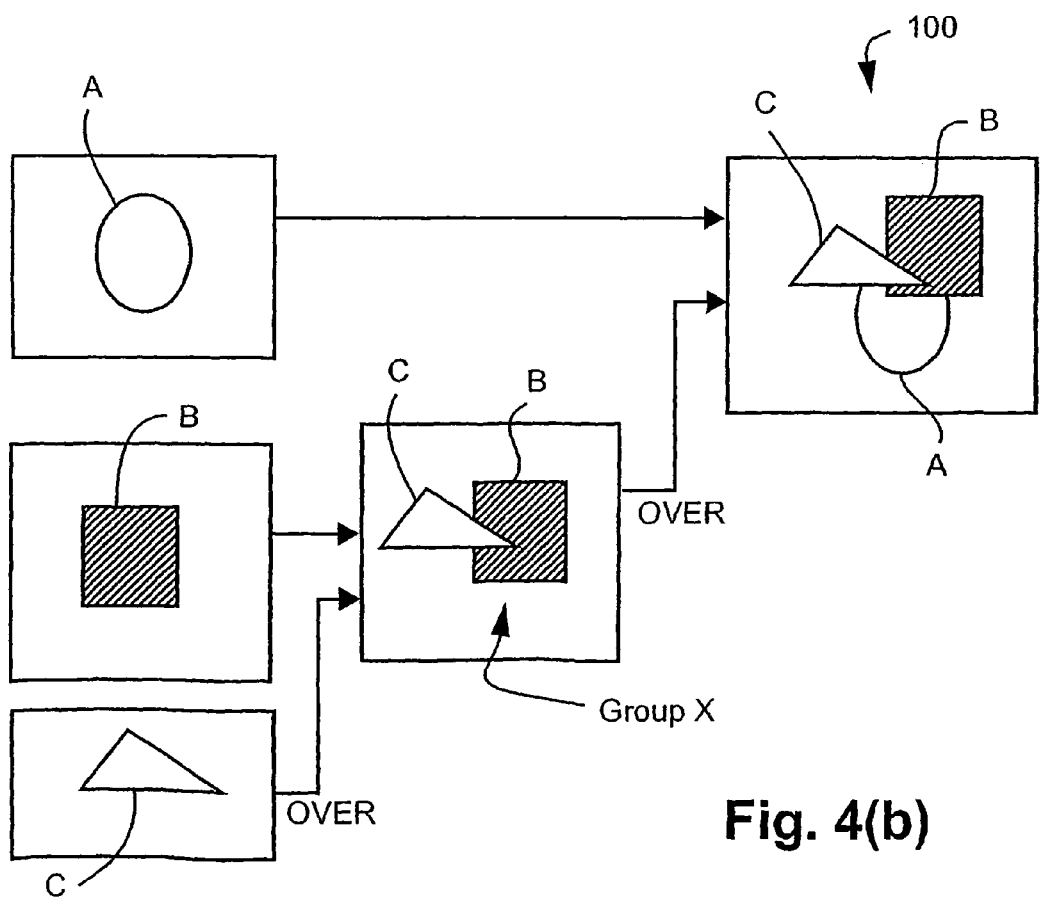
FIG. 4(b) shows the operations involved during the rendering of the objects of FIG. 4(a)
Figure 5B:
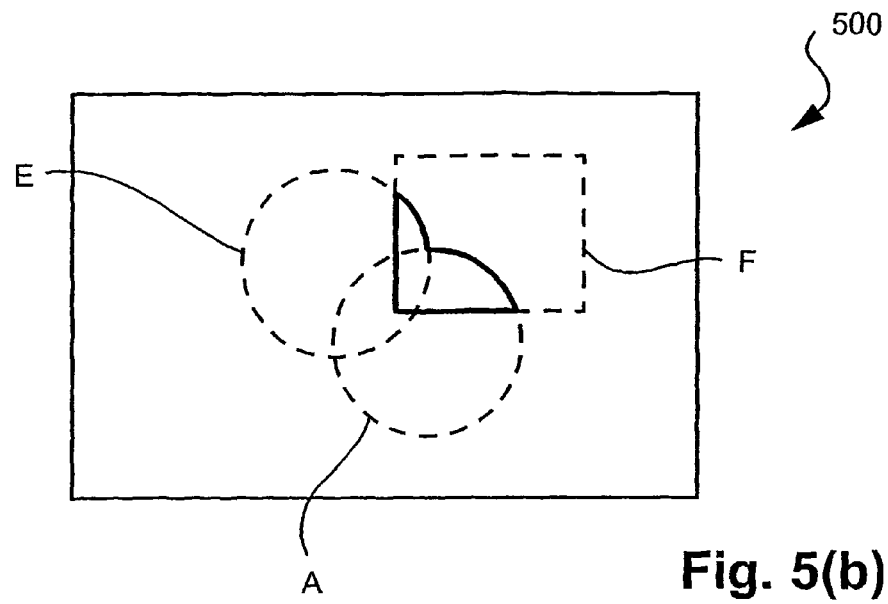
FIG. 5(b) shows an image resulting from the operations of FIG. 5(a)
Figure 5A:
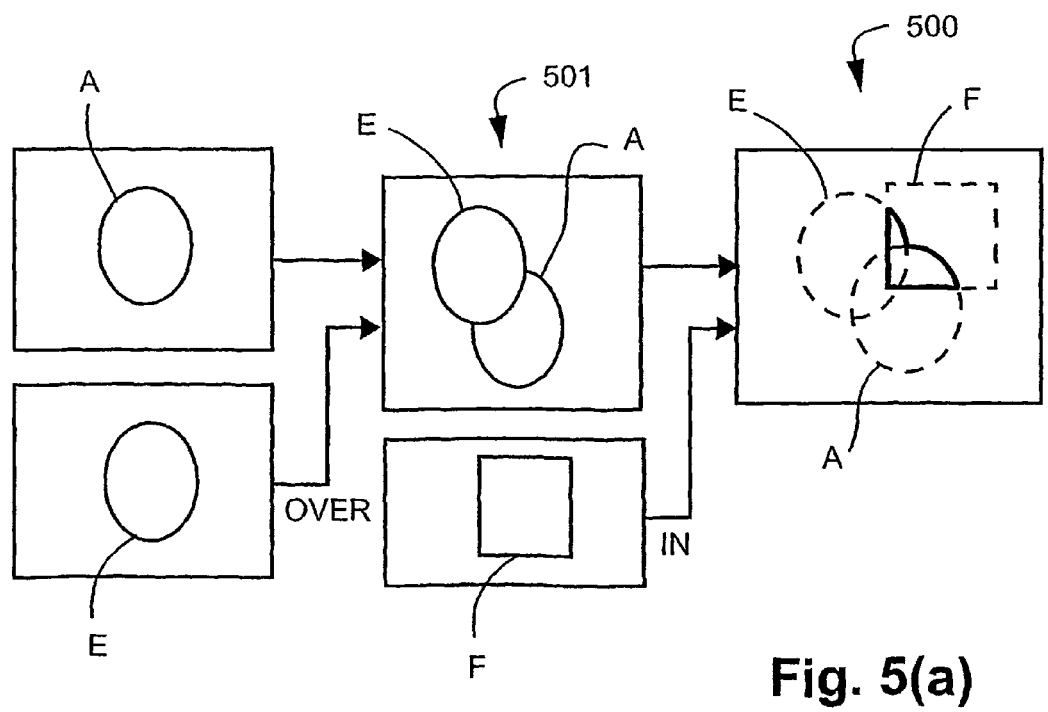
FIG. 5(a) shows the operations involved during the rendering of three objects.
Figure 6B:
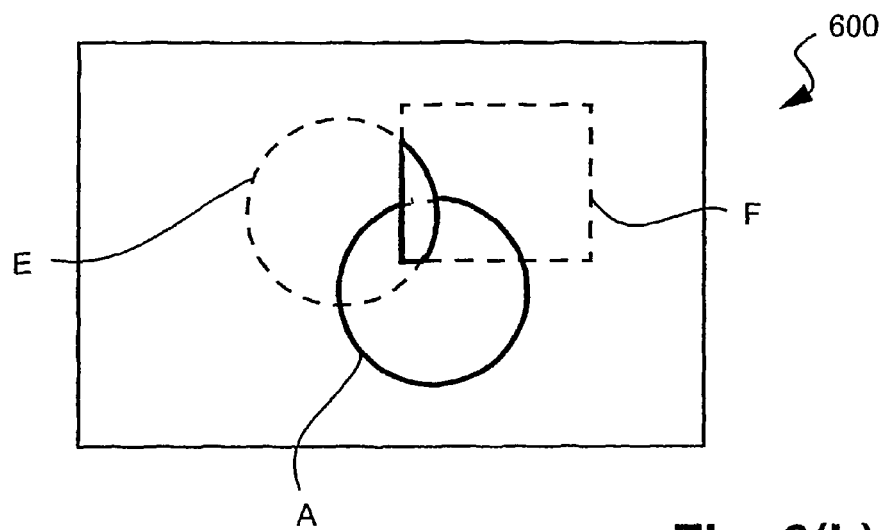
FIG. 6(b) shows an image resulting from the operations of FIG. 6(a)
Figure 6A:
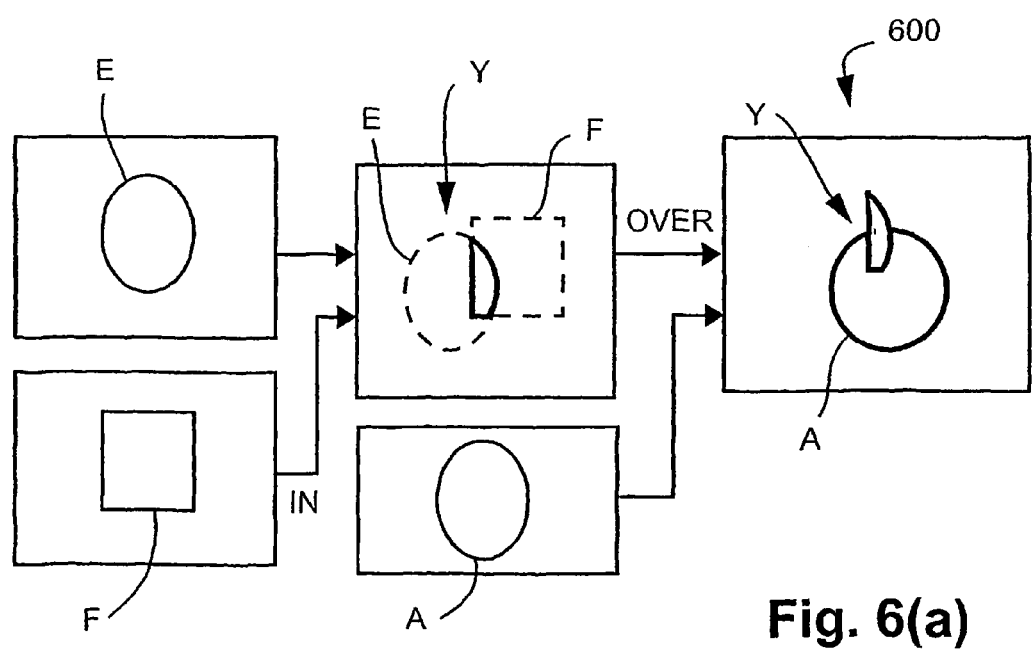
FIG. 6(a) shows the operations involved during the rendering of three objects.
Figure 7:
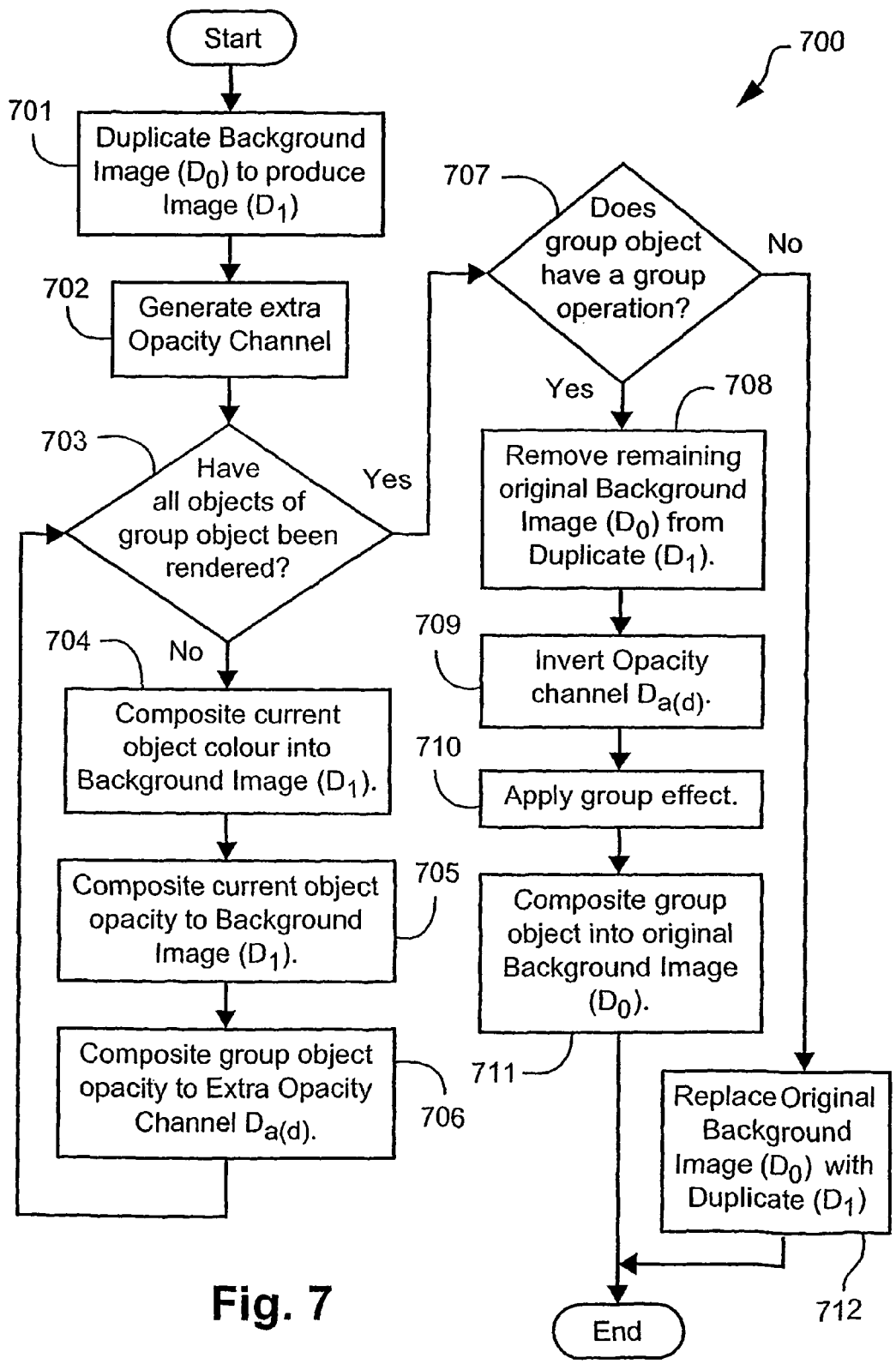
FIG. 7 is a flow diagram showing a method of compositing a group of graphical objects in accordance with one embodiment.

The method 700 of compositing a group of graphical objects (hereinafter 'the group object') onto a background image, will now be described, with reference to FIG. 7. The method 700 will be further described below with reference to an example shown in FIGS. 8(*a*) to 16.

Prior to executing the method 700, a background image ($D_o$) is generated by compositing one or more graphical objects to produce the background image ($D_o$). The background image ($D_o$) includes pixel value background colour components (e.g. RGB colour components) and opacity (i.e., alpha channel). Similarly, each one of the objects in the group object, includes colour components and opacity.

The method 700 is preferably implemented as software resident in memory 1706 and controlled in its execution by the processor 1705. The method 700 preferably uses bitmap rendering, where each object is completely drawn into a destination bitmap one at a time. Alternatively, other rendering techniques can be utilised in accordance with the described embodiments, including scan line rendering (i.e., complete single scan lines are generated one at a time) or pixel rendering (i.e., the final value of each pixel is generated one at a time).

The method begins at step 701, where the processor 1705 duplicates the background image ($D_o$) to produce a duplicate background image ($D_1$). Also at step 701, the processor 1705 stores the original background image ($D_o$), in memory 1706, for later compositing with the group object. In the method 700, the duplicate background image ($D_1$) is used for generating each of the objects in the group object. Once the group object is generated in ($D_1$), the group object is composited back onto the background image ($D_o$).

The method 700 continues at the next step 702, where the processor 1705 generates an alpha channel ($D_{a(d)}$) for storing the opacity values of the background image ($D_0$) remaining in the duplicate background image ($D_1$), during the operation of compositing the group object onto the background image ($D_1$). The duplicate background image ($D_1$) initially contains identical values to the background image ($D_0$). Further, the alpha channel ($D_{a(d)}$) is initially set to fully opaque.

The following steps 703, 704, 705 and 706 of the method 700 composite each of the objects of the group object, into the duplicate background image ($D_1$) and the alpha channel ($D_{a(d)}$). At step 703, if the processor 1705 determines that each of the objects of the group object have been rendered into the duplicate background image ($D_1$) then the method 700 proceeds to step 707. Otherwise, the method 700 proceeds to step 704, where the colour component values associated with a current object of the group object are composited into the duplicate background image ($D_1$). The colour components of the current object are composited at step 704 using an equation shown in the colour column, $D_{ca}'$, of Table 2, depending on the compositing operation being performed.

At the next step 705, the processor 1705 composites the alpha channel of the current object of the group object onto an alpha channel (not shown) associated with the duplicate of the background image ($D_1$). The compositing of the alpha channel of the current object of the group object in step 705 is performed using an equation shown in the opacity column ($D_a'$) of Table 2, depending on the compositing operation being used.

The method 700 continues at the next step 706, where the processor 1705 composites the alpha channel of the current object of the group object onto the alpha channel, $D_{a(d)}'$, generated at step 702. The compositing of the alpha channel in step 706 is performed using an equation shown in the ($D_{a(d)}'$) column of Table 2, depending on the compositing operation being used. For example, for the compositing operation "ATOP", the function $f(Sc, Dc)=Sc$, $X=1$, $Y=0$ and $Z=1$, as seen in Table 2. Therefore, $D_{ca1}'=S_{ca} \cdot D_{a1}+D_{ca1} \cdot (1-S_a)$, $D_{a1}'=D_{a1}$ and $D_{a1(d)}'=D_{a1(d)} \cdot (1-S_a)$. Following step 706, the method 700 returns to step 703.

Once each of the objects of the group object have been rendered into the duplicate background image ($D_1$), then the method 700 proceeds to step 707. At step 707, if the group object has an associated group opacity, a filter effect or any other operation acting on the group object as a whole, then the method 700 proceeds to step 708. Otherwise, the method 700 proceeds to step 712, where processor 1705 replaces the background image ($D_0$) with the duplicate background image including the group object ($D_1$), and the method 700 concludes.

At step 708, the processor 1705 removes any of the background colour left in the duplicate background image ($D_1$) from the duplicate background image ($D_1$) prior to applying the group opacity or effect, for example, to the group object rendered in the duplicate background image ($D_1$). In order to execute step 708, the processor 1705 determines the updated premultiplied colour component value ($D_{ca1}'$), and the updated destination opacity component value ($D_{a1}'$), for each pixel of the duplicate background image ($D_1$). The processor 1705 determines the values ($D_{ca1}'$) and ($D_{a1}'$) in accordance with the following equations:

$$D_{ca1}' = D_{ca1} - D_{ca0} \cdot D_{a1(d)} \quad (3)$$

$$D_{a1}' = D_{a1} - D_{a0} \cdot D_{a1(d)} \quad (4)$$

The method 700 continues at the next step 709, where the processor 1705 inverts ($D_{a1(d)}'$). The result of step 709, represents the amount of the original background image ($D_0$) removed from the duplicate background image ($D_1$) during the execution of steps 703 to 706.

$$D_{a1(d)}' = 1 - D_{a1(d)} \quad (5)$$

At the next step 710, the processor 1705 applies the group effect (e.g. the group opacity or the filter effect) to the group object to produce a completed group object. The method 700 concludes at the next step 711, where the processor 1705 composites the completed group object onto the original background image ($D_0$). The colour and opacity component values of the original background image ($D_0$) are calculated at step 711 in accordance with the following equations (6) and (7):

$$D_{ca0}' = f(D_{c1}, D_{c0}) \cdot D_{a1} \cdot D_{a0} + Y \cdot D_{ca1} \cdot (1 - D_{a0}) + Z \cdot D_{ca0} \cdot (1 - D_{a1(d)}) \quad (6)$$

$$D_{a0}' = X \cdot D_{a1} \cdot D_{a0} + Y \cdot D_{a1} \cdot (1 - D_{a0}) + Z \cdot D_{a0} \cdot (1 - D_{a1(d)}) \quad (7)$$

The method 700 will now be further described below by way of an example shown in FIGS. 8(a) to 16.

Figure 8A:
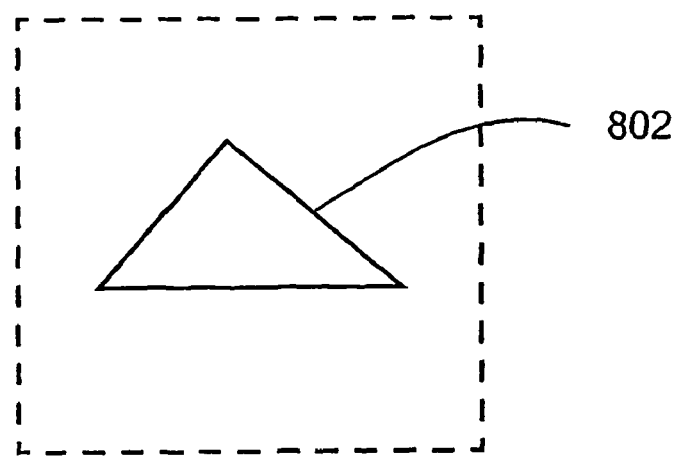
FIG. 8(a) shows a green object that is partially transparent.
Figure 8B:
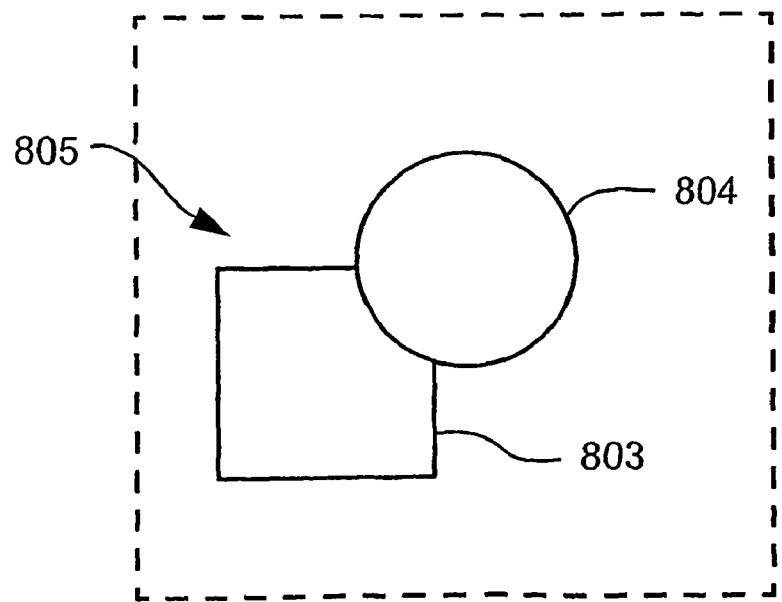
FIG. 8(b) shows a group object.

FIG. 8(a) shows a 100% green object 802 that is 60% opaque. The colour and opacity component values of the green object 802 are therefore, R=0, G=0.6, B=0 and A=0.6. FIG. 8(b) shows a group object 805. The group object 805 contains two objects 803 and 804. The first object 803 is red and is 80% opaque. The colour and opacity component values of the red object 803 are therefore, R=0.8, G=0, B=0 and A=0.8. The "XOR" compositing operation is associated with the red object 803. As such, the red object 803 will be composited onto any background image using the XOR compositing operation.

The second object 804, of the group object 805, is purple and is 70% opaque. The colour and opacity component values of the purple object 804 are therefore, R=0.7, G=0, B=0.7 and A=0.7. The "ROVER" compositing operation is associated with the object 804. As such, the purple object 804 will be composited onto any background image using the ROVER compositing operation. The group object 805 is 50% opaque and the "OVER" compositing operation is associated with the group object. As such, the group object 805 will be composited onto any background image using the OVER compositing operation.

Figure 9:
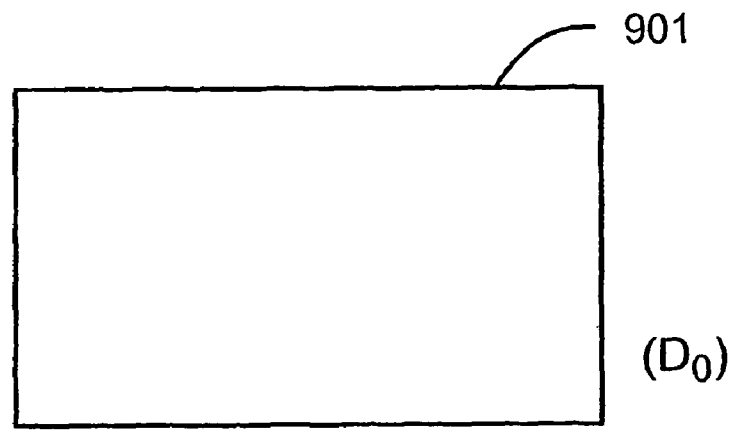
FIG. 9 shows a clear background image upon which the objects of FIGS. 8(a) and 8(b) will be composited, in accordance with an example.

FIG. 9 shows a clear (i.e., $D_{ca0}'=0$, and $D_{a0}'=0$) background image ($D_0$) 901, upon which the object 802 and the group object 805 will be composited, using bitmap rendering, in accordance with the example. Again, other rendering techniques can be utilised in accordance with the example, including scan line rendering or pixel rendering, for example.

Figure 10:
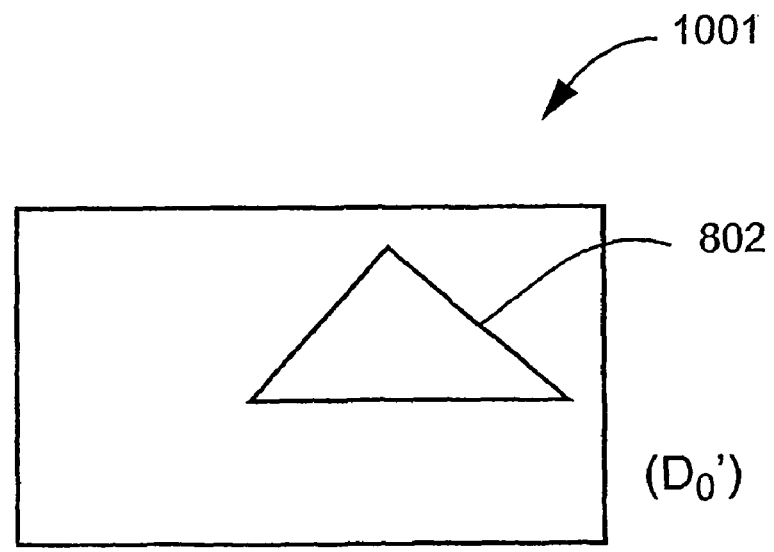
FIG. 10 shows the object of FIG. 8(a) composited onto the background image of FIG. 9.

In the example, the object 802 is initially composited onto the background image ($D_0$), resulting in an updated background image ($D_0'$) 1001, as seen in FIG. 10. The object 802 is composited onto the background image ($D_0$) using the compositing operation (i.e., OVER) associated with the object 802.

Figure 11:
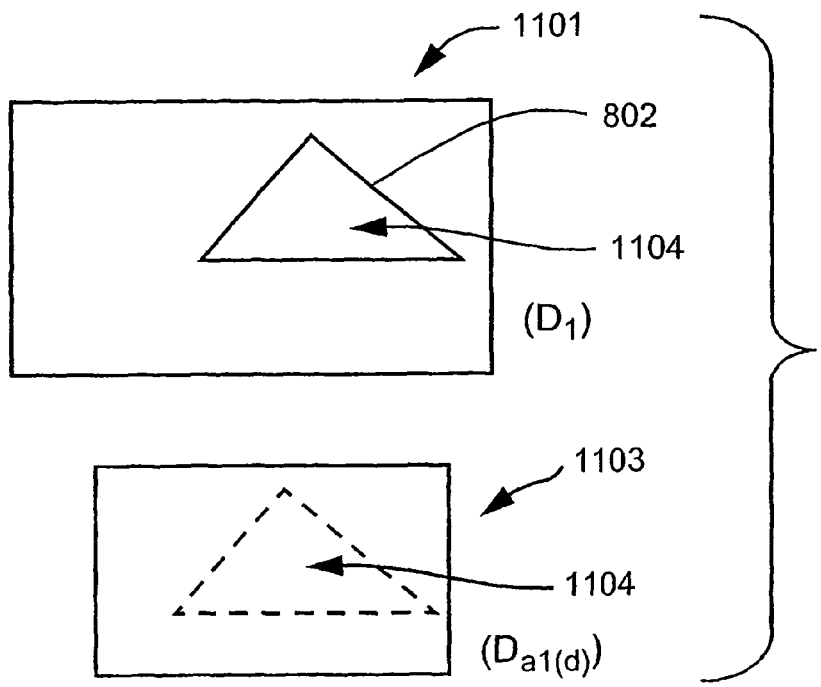
FIG. 11 shows a duplicate of the background image of FIG. 10 and an extra opacity channel.

As at steps 701 and 702 of the method 700, the background image (D0) 1001 is duplicated to produce a duplicate background image ($D_1$)) 1101, as seen in FIG. 11. The background image ($D_o'$) 1001 can be stored in memory 1706 for later compositing with the group object 805. As at step 702, an alpha channel ($D_{a(d)}$) 1103, as shown in FIG. 11, is also generated for storing the opacity values of the background image ($D_0$) 901 remaining in the duplicate background image ($D_1$) 1101, following the compositing of the group object (i.e., objects 803 and 804) onto the background image ($D_1$) 1101. The alpha channel $D_{a(d)}$ is initially set to one representing a fully opaque object (i.e., $D_{a(d)}=1$). For the region 1104 formed by the object 802, as seen in FIG. 11, the updated destination values following the creation of the duplicate background image ($D_1$) 1101, and the alpha channel ($D_{a(d)}$) 1103, are listed below:

|      |                |              |     |
| ---- | -------------- | ------------ | --- |
| (i)  | $D_{ra1}'=$    | $D_{ra0}=$   | 0   |
| (ii) | $D_{ga1}'=$    | $D_{ga0}=$   | 0.6 |
| (iii)| $D_{ba1}'=$    | $D_{ba0}=$   | 0   |
| (iv) | $D_{a1}'=$     | $D_{a0}=$    | 0.6 |
| (v)  | $D_{a1(d)}'=$  |              | 1   |

Figure 12:
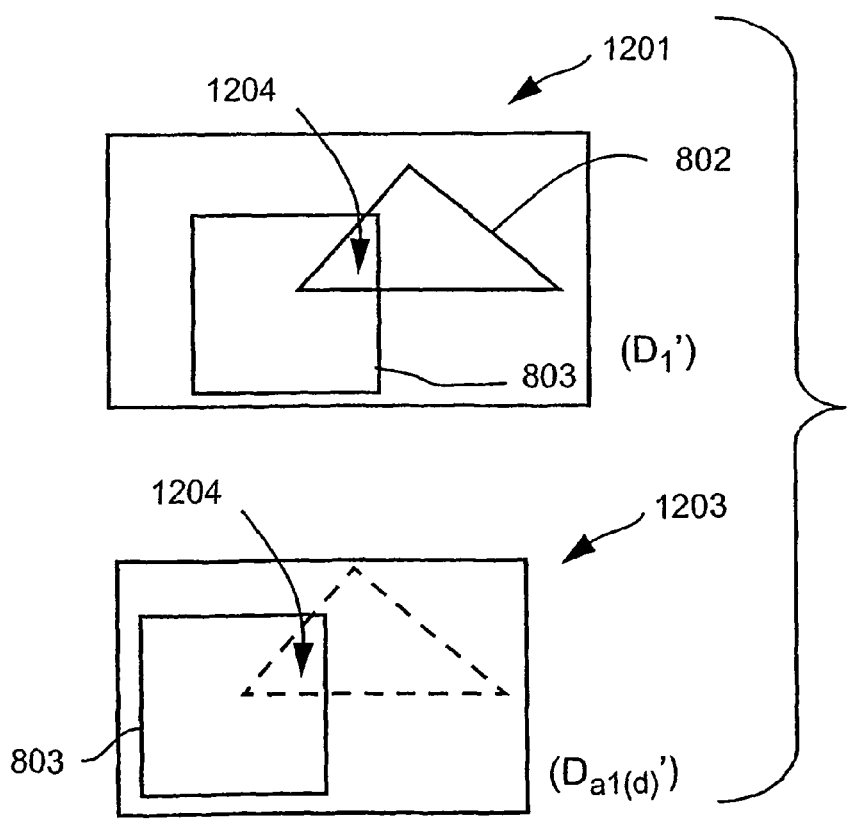
FIG. 12 shows an updated duplicate background image and an updated alpha channel following the compositing of an object of FIG. 8(b) onto the duplicate background image of FIG. 11.

FIG. 12 shows an updated duplicate background image ($D_1'$) 1201 following the compositing of the object 803 onto the duplicate background image ($D_1$) 1101 including the object 802, as at steps 703 to 706 of the method 700. FIG. 12 also shows the updated alpha channel ($D_{a(d)}'$) 1203 following the compositing of the object 803. The object 803 is composited onto the duplicate background image ($D_1$) 1101 using the XOR compositing operation. As such, from Table 2, $f(S_c, D_c)=0$, X=0, Y=1 and Z=1. Further, the equations for colour $D_{ca1}'$, opacity $D_{a1}'$ and $D_{a1(d)}'$ for the XOR compositing operation are listed below:

$$D_{ca1}' = S_{ca} \cdot (1 - D_{a1}) + D_{ca1} \cdot (1 - S_a) \quad (i)$$

$$D_{a1}' = S_a \cdot (1 - D_{a1}) + D_{a1} \cdot (1 - S_a) \quad (ii)$$

$$D_{a1(d)}' = D_{a1(d)} \cdot (1 - S_a) \quad (iii)$$

The updated destination values for the region of overlap 1204 of the objects 802 and 803, as seen in FIG. 12, following the compositing of the object 803 onto the duplicate background image ($D_1$) 1101 are listed below:

|       |                                                                  |                                          |      |
| ----- | ---------------------------------------------------------------- | ---------------------------------------- | ---- |
| (i)   | $D_{ra1}' = S_{ra} \cdot (1-D_{a1}) + D_{ra1} \cdot (1-S_a) =$    | $0.8 \cdot (1-0.6) + 0 \cdot (1-0.8) =$  | 0.32 |
| (ii)  | $D_{ga1}' = S_{ga} \cdot (1-D_{a1}) + D_{ga1} \cdot (1-S_a) =$    | $0 \cdot (1-0.6) + 0.6 \cdot (1-0.8) =$  | 0.12 |
| (iii) | $D_{ba1}' = S_{ba} \cdot (1-D_{a1}) + D_{ba1} \cdot (1-S_a) =$    | $0 \cdot (1-0.6) + 0 \cdot (1-0.8) =$    | 0    |
| (iv)  | $D_{a1}' = S_{ca} \cdot (1-D_{a1}) + D_{a1} \cdot (1-S_a) =$      | $0.8 \cdot (1-0.6) + 0.6 \cdot (1-0.8) =$| 0.44 |
| (v)   | $D_{a1(d)}' = D_{a1(d)} \cdot (1-S_a) =$                          | $1 \cdot (1-0.8) =$                      | 0.2  |

Figure 13:
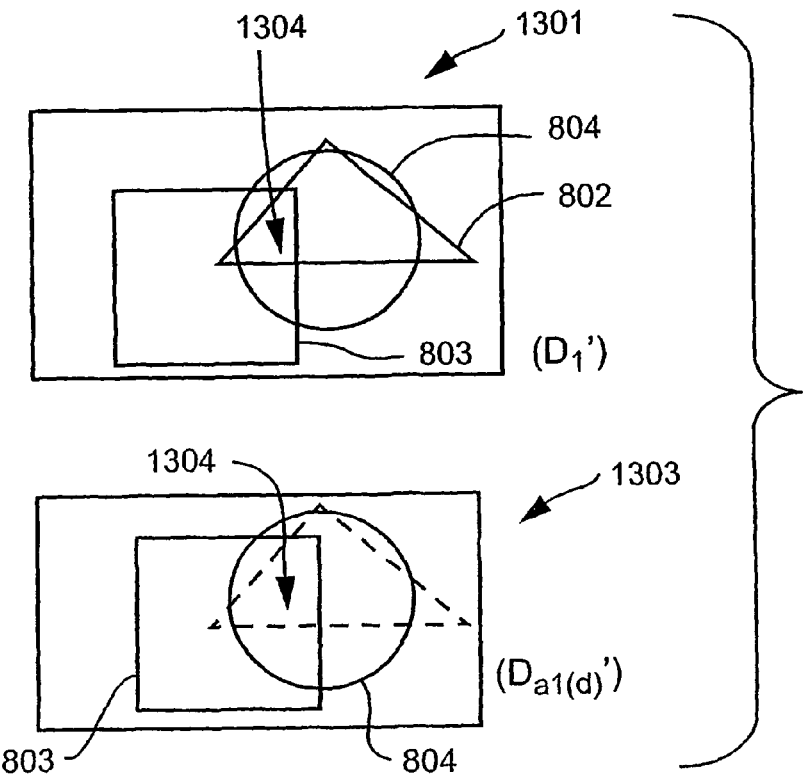
FIG. 13 shows a further updated duplicate background image and an updated alpha channel following the compositing of another object of FIG. 8(b) onto the duplicate background image of FIG. 12.
Figure 14:
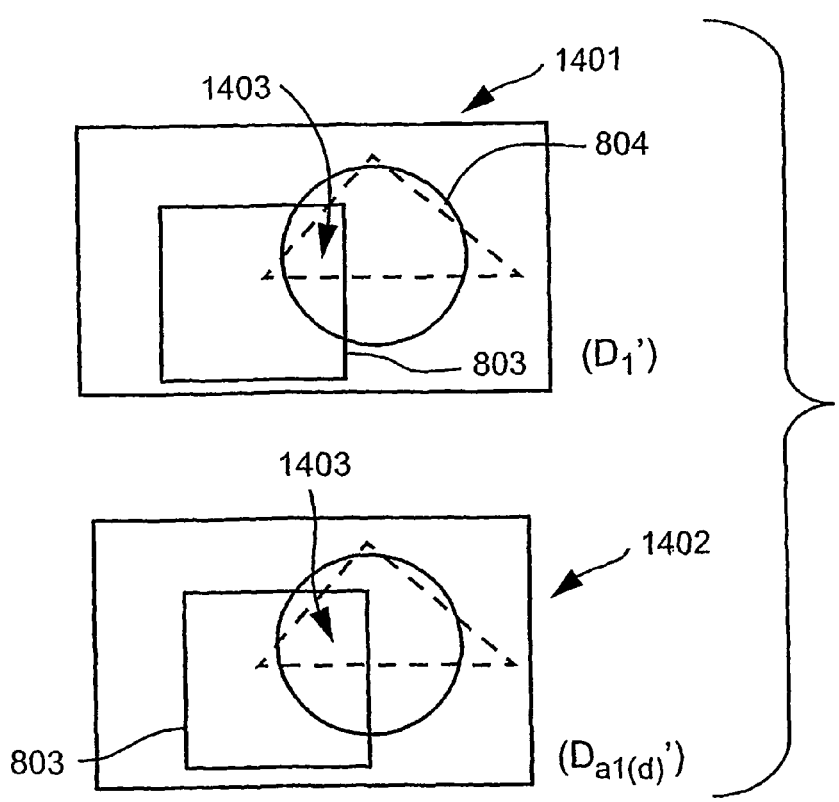
FIG. 14 shows a further updated duplicate background image following background colour removal.

FIG. 13 shows an updated duplicate background image ($D_1'$) 1301 following the compositing of the object 804 onto the previously updated duplicate background image ($D_1'$) 1201, as at steps 703 to 706 of the method 700. FIG. 13 also shows the updated alpha channel ($D_{a(d)}'$) 1303 following the compositing of the object 804. The object 804 is composited onto the previously updated background image ($D_1'$) 1201 using the ROVER compositing operation. As such, from Table 2, $f(S_c, D_c) = D_c$, X=1, Y=1 and Z=1. Further, the equations for colour $D_{ca1}'$, opacity $D_{a1}'$ and $D_{a1(d)}'$ for the ROVER compositing operation are listed below:

(i) $D_{ca1}' = D_{ca1} \cdot S_a + S_{ca} \cdot (1 - D_{a1}) + D_{ca1} \cdot (1 - S_a) = D_{ca1} + S_{ca} \cdot (1 - D_{a1})$
(ii) $D_{a1}' = D_{a1} \cdot S_a + S_a \cdot (1 - D_{a1}) + D_{a1} \cdot (1 - S_a) = D_{a1} + S_a \cdot (1 - D_{a1})$
(iii) $D_{a1(d)}' = D_{a1(d)} \cdot (1 - S_a)$ The updated destination values for the region of overlap 1304 of the objects 802, 803 and 804, as seen in FIG. 13, following the compositing of the object 804 onto the previously updated duplicate background image ($D_1'$) 1201 are listed below:

(i) $D_{ra1}' = D_{ra1} + S_{ra} \cdot (1 - D_{a1}) = 0.32 + 0.7 \cdot (1 - 0.44) = 0.712$
(ii) $D_{ga1}' = D_{ga1} + S_{ga} \cdot (1 - D_{a1}) = 0.12 + 0 \cdot (1 - 0.44) = 0.12$
(iii) $D_{ba1}' = D_{ba1} + S_{ba} \cdot (1 - D_{a1}) = 0 + 0.7 \cdot (1 - 0.44) = 0.392$
(iv) $D_{a1}' = D_{a1} + S_a \cdot (1 - D_{a1}) = 0.44 + 0.7 \cdot (1 - 0.44) = 0.832$
(v) $D_{a1(d)}' = D_{a1(d)} \cdot (1 - S_a) = 0.2 \cdot (1 - 0.7) = 0.06$ FIG. 14 shows an updated duplicate background image ($D_1'$) 1401 following the removal of any remaining colour attributed to the previously updated duplicate background image ($D_1'$) 1301, as at step 708, and inverting the result of $D_{a1(d)}$, as at step 709 of the method 700. As described above, in order to produce the updated duplicate background image ($D_1'$) 1401, the processor 1705 determines the updated pre-multiplied colour component value ($D_{ca1}'$), and the updated destination opacity component value ($D_{a1}'$), for each pixel of the updated duplicate background image ($D_1'$) 1401. FIG. 14 also shows the updated alpha channel ($D_{a(d)}'$) 1402 following the inversion step 709. As such, the equations for colour $D_{ca1}'$, opacity $D_{a1}'$, and $D_{a1(d)}'$ for the operation of steps 708 are listed as follows:

(i) $D_{ca1}' = D_{ca1} - D_{ca0} \cdot D_{a1(d)}$
(ii) $D_{a1}' = D_{a1} - D_{a0} \cdot D_{a1(d)}$
(iii) $D_{a1(d)}' = 1 - D_{a1(d)}$ The updated destination values for the region of overlap 1403, as seen in FIG. 14, following the operation of steps 708 and 709 on the previously updated duplicate background image ($D_1'$) 1301 are listed below:

(i) $D_{ra1}' = D_{ra1} - D_{ra0} \cdot D_{a1(d)} = 0.712 - 0 \cdot 0.06 = 0.712$
(ii) $D_{ga1}' = D_{ga1} - D_{ga0} \cdot D_{a1(d)} = 0.12 - 0.6 \cdot 0.06 = 0.084$
(iii) $D_{ba1}' = D_{ba1} - D_{ba0} \cdot D_{a1(d)} = 0.392 - 0 \cdot 0.06 = 0.392$
(iv) $D_{a1}' = D_{a1} - D_{a0} \cdot D_{a1(d)} = 0.832 - 0.6 \cdot 0.06 = 0.796$
(v) $D_{a1(d)}' = 1 - D_{a1(d)} = 1 - 0.06 = 0.94$ FIG. 15 shows an updated duplicate background image ($D_1'$) 1501 following the application of group opacity to the previously updated duplicate background image ($D_1'$) 1401 and the previously updated alpha channel ($D_{a(d)}'$) 1402, as at step 710 of the method 700. The equations for colour $D_{ca1}'$, opacity $D_{a1}'$, and $D_{a1(d)}'$ for the operation of step 710 are listed as follows:

(i) $D_{ca1}' = D_{ca1} \cdot 0.5$
(ii) $D_{a1}' = D_{a1} \cdot 0.5$
(iii) $D_{a1(d)}' = D_{a1(d)} \cdot 0.5$ The updated destination values for the region of overlap 1503, as seen in FIG. 15, following the operation of step 710 on the previously updated duplicate background image ($D_1'$) 1401 and opacity ($D_{a(d)}'$) 1402 are listed below:

(i) $D_{ra1}' = 0.712 \cdot 0.5 = 0.356$
(ii) $D_{ga1}' = 0.084 \cdot 0.5 = 0.042$
(iii) $D_{ba1}' = 0.392 \cdot 0.5 = 0.196$
(iv) $D_{a1}' = 0.796 \cdot 0.5 = 0.398$
(v) $D_{a1(d)}' = 0.94 \cdot 0.5 = 0.47$ FIG. 16 shows an updated original background image ($D_0'$) 1601 following the compositing of the group object 805 of the previously updated duplicate background image ($D_1'$) 1501 of FIG. 15, onto the background image ($D_0'$) 1001, as at step 711 of the method 700. The group object 805 is composited onto the background image ($D_0'$) 1001 using the OVER compositing operation. As such, from Table 2, $f(S_c, D_c) = S_c$, $X=1$, $Y=1$ and $Z=1$. Further, the equations for colour $D_{ca1}'$, opacity $D_{a1}'$ for the OVER compositing operation are listed below:

(i) $D_{ca1}' = S_{ca} \cdot D_{a1} + S_{ca} \cdot (1 - D_{a1}) + D_{ca1} \cdot (1 - D_{a1(d)}) = S_{ca} + D_{ca1} \cdot (1 - D_{a1(d)})$
(ii) $D_{a1}' = S_a \cdot D_{a1} + S_a \cdot (1 - D_{a1}) + D_{a1} \cdot (1 - D_{a1(d)}) = S_a + D_{a1} \cdot (1 - D_{a1(d)})$ The updated destination values for the region of overlap 1602, as seen in FIG. 16, following the operation of step 711 on the background image ($D_0'$) 1001 are listed below:

(i) $D_{ra1}' = S_{ra} + D_{ra1} \cdot (1 - _{Da1(d)}) = 0.356 + 0 \cdot (1 - 0.47) = 0.356$
(ii) $D_{ga1}' = S_{ga} + D_{ga1} \cdot (1 - _{Da1(d)}) = 0.042 + 0.6 \cdot (1 - 0.47) = 0.36$
(iii) $D_{ba1}' = S_{ba} + D_{ba1} \cdot (1 - _{Da1(d)}) = 0.196 + 0 \cdot (1 - 0.47) = 0.196$
(iv) $D_{a1}' = S_a + D_{a1} \cdot (1 - _{Da1(d)}) = 0.398 + 0.6 \cdot (1 - 0.47) = 0.716$ As described above, the principles of the method 700 have general applicability to any rendering system that accepts input graphical objects and generates a final image. The final image may be represented in any suitable format (e.g. pixels or rendering commands). The input objects for such a rendering system can be generated using a graphical user interface, where a user can group a plurality of objects together in order to process the group of objects as a single object (or group object). Such a group object allows any operation (e.g. group opacity or input filtering) that can be performed on a single object to be performed on the group object. Each separate input object of such a rendering system includes an associated compositing operation used to composite the object onto a background image.

As also described above, the method 700 utilises equations (1) and (2) to determine the result of compositing source pixel values with destination pixel values. A source pixel value may be associated with either a single input object or a group of objects represented as a single object. For each pixel, a value is determined using equations (1) and (2) for each colour component (e.g. R, G, B) and for the alpha channel. The source colour component values are stored in a source buffer and the destination colour component values are stored in a destination buffer.

In one implementation of the method 700, the source and destination buffers can be in the form of image bitmaps substantially identical in size and position. A plurality of such image bitmaps can be layered to form an "image file", where each layer of the image file comprises bitmap information for each pixel in the layer. In such an implementation, the source colour component values 'S', as described above, may be accessed from one or more layers of a source image file and the destination colour component values 'D', as described above, resulting from the combination of the source colour component values may be output to a further image file or to an output device. The operation used to combine the source pixels from each of the layers of the source image file can be specified in the source image file. Such a source image file may also specify the grouping of image layers, where a subset of the source image file is first composited together to produce a resultant value, which is subsequently combined with the other layers of the source image file in accordance with the method 700 described above.

As an example of the implementation described directly above, vector graphics representations of input objects to a rendering system may be converted by the rendering system to pixel based objects in the form of an image file. The image file can then be included as an object in a further vector graphics file and then be processed in accordance with the method 700 by the rendering system and a resultant destination image file can be subsequently converted back to vector based graphics objects for rendering.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequential.

The foregoing describes only some embodiments of the present invention, and modifications and/or changes can be made thereto without departing from the scope and spirit of the invention, the embodiments being illustrative and not restrictive. For example, various techniques can be used to perform the rendering operations in accordance with the embodiments described above. Where bitmap rendering is used, each object is completely drawn into the bitmap one at a time. Where a copy of a background image is made, or extra storage is needed to store a pixel, a buffer can be used. Alternatively, other rendering techniques can be utilised in accordance with the described embodiments including scan line rendering where complete single scan lines are generated, one at a time, or pixel rendering where the final value of each pixel is generated one at a time.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A computer-implemented method of representing an amount of image color in a composite image, said method comprising the steps of:
    generating at least one additional opacity channel for use in creating the composite image, the additional opacity channel initially set to fully opaque to represent that all of the image color is visible;
    compositing at least one partially transparent graphical object having object color and object opacity, with an image having image opacity and the image color, to create the composite image, the composite image having composite image color and composite image opacity, the composite image color and composite image opacity being derived from one or more of the object color, the object opacity, the image color and the image opacity;
    compositing the object opacity with the additional opacity channel to update the additional opacity channel, the updated additional opacity channel thereby being less than fully opaque and representing an amount of the image color remaining in the composite image following the compositing of the at least one graphical object with the image; and
    storing at least the updated additional opacity channel in a computer-readable memory,
    wherein the steps are performed on a processor.

2. A method according to claim 1, further comprising the step of utilizing the updated additional opacity channel to remove the image color and image opacity remaining in the composite image following composition with the object color and object opacity.

3. A method according to claim 2, further comprising the step of utilizing the updated additional opacity channel to composite the object color and object opacity with the image color and image opacity.

4. A method according to any one of claims 1 to 3, wherein the at least one object is one object of a grouped plurality of objects.

5. A method according to claim 4, further comprising the step of applying a group effect to the grouped plurality of objects.

6. A method according to claim 4, further comprising the step of compositing object color and object opacity of each object of the grouped plurality of objects with the image color and image opacity.

7. A method according to claim 1, further comprising the step of inverting the opacity values of the updated additional opacity channel.

8. A method according to claim 1, further comprising the step of copying the image to form an image copy.

9. A method according to claim 8, further comprising the step of compositing the object color and object opacity with color and opacity component values of the image copy.

10. A method according to claim 9, wherein the updated additional opacity channel represents opacity component values associated with the image copy remaining in the image copy following composition of the object color and object opacity with the color and opacity component values of the image copy.

11. A method according to claim 9, further comprising the step of utilizing the updated additional opacity channel to remove the color and opacity component values of the image copy remaining in the image copy following composition of the object color and object opacity with the color and opacity component values of the image copy.

12. A method according to claim 11, further comprising the step of utilizing the updated additional opacity channel to composite the object color and object opacity with the image color and image opacity.

13. A method according to claim 1, wherein the object color and object opacity are accessed from an image file.

14. A method according to claim 1, wherein the image color and image opacity are accessed from an image file.

15. The method according to claim 4, further comprising the step of compositing the composite image with the image using a group opacity.

16. A computer-implemented method of representing an amount of image color in a composite image, said method comprising the steps of:
generating at least one additional opacity channel for use in creating the composite image, the additional opacity channel initially set to fully opaque to represent that all of the image color is visible;
compositing at least one partially transparent graphical object having object color and object opacity, with an image having image opacity and the image color, to create the composite image, the composite image having composite image color and composite image opacity, the composite image color and composite image opacity being derived from one or more of the object color, the object opacity, the image color and the image opacity;
compositing the object opacity with the additional opacity channel to update the additional opacity channel, the updated additional opacity channel thereby being less than fully opaque and representing an amount of the image color remaining in the composite image following the compositing of the at least one graphical object with the image;
storing at least the updated additional opacity channel in a computer-readable memory; and
utilizing the stored updated additional opacity channel to remove the remaining image color in the composite image,
wherein the steps are performed on a processor.

17. A method according to claim 16, further comprising the step of utilizing the updated additional opacity channel to composite the object color and object opacity with the image color and image opacity component.

18. A method according to either one of claims 16 or 17, wherein the at least one object is one object of a grouped plurality of objects.

19. An apparatus for representing an amount of image color in a composite image, said apparatus comprising:
means for generating at least one additional opacity channel for use in creating the composite image, the additional opacity channel initially set to fully opaque to represent that all of the image color is visible;
means for compositing at least one partially transparent graphical object having object color and object opacity, with an image having image opacity and the image color, to create the composite image, the composite image having composite image color and composite image opacity, the composite image color and composite image opacity being derived from one or more of the object color, the object opacity, the image color and the image opacity; and
means for compositing the object opacity with the additional opacity channel to update the additional opacity channel, the updated additional opacity channel thereby being less than fully opaque and representing an amount of the image color remaining in the composite image following said compositing of the at least one graphical object with the image.

20. An apparatus representing an amount of image color in a composite image, said apparatus comprising:
means for generating at least one additional opacity channel for use in creating the composite image, the additional opacity channel initially set to fully opaque to represent that all of the image color is visible;
means for compositing at least one partially transparent graphical object having object color and object opacity, with an image having image opacity and the image color, to create the composite image, the composite image having composite image color and composite image opacity, the composite image color and composite image opacity being derived from one or more of the object color, the object opacity, the image color and the image opacity; and
means for compositing the object opacity with the additional opacity channel to update the additional opacity channel, the updated additional opacity channel thereby being less than fully opaque and representing an amount of the image color remaining in the composite image following the compositing of the at least one graphical object with the image, and utilizing the updated additional opacity channel to remove the remaining image color in the composite image.

21. An apparatus for representing an amount of image color in a composite image, said apparatus comprising:
a memory for storing data and a computer program; and
a processor coupled to said memory for executing said computer program, said computer program comprising:
code for generating at least one additional opacity channel for use in creating the composite image, the additional opacity channel initially set to fully opaque to represent that all of the image color is visible;
code for compositing at least one partially transparent graphical object having object color and object opacity, with an image having image opacity and the image color, to create the composite image, the composite image having composite image color and composite image opacity, the composite image color and composite image opacity being derived from one or more of the object color, the object opacity, the image color and the image opacity; and code for compositing the object opacity with the additional opacity channel to update the additional opacity channel, the updated additional opacity channel thereby being less than fully opaque and representing an amount of the image color remaining in the composite image following the compositing of the at least one graphical object with the image.

22. An apparatus for representing an amount of image color in a composite image, said apparatus comprising:

a memory for storing data and a computer program; and a processor coupled to said memory for executing said computer program, said computer program comprising:

code for generating at least one additional opacity channel for use in creating the composite image, the additional opacity channel initially set to fully opaque to represent that all of the image color is visible;

code for compositing at least one partially transparent graphical object having object color and object opacity, with an image having image opacity and the image color, to create the composite image, the composite image having composite image color and composite image opacity, the composite image color and composite image opacity being derived from one or more of the object color, the object opacity, the image color and the image opacity;

code for compositing the object opacity with the additional opacity channel to update the additional opacity channel, the updated additional opacity channel thereby being less than fully opaque and representing an amount of the image color remaining in the composite image following the compositing of the at least one graphical object with the original image; and code for utilizing the updated additional opacity channel to remove the remaining image color in the composite image.

23. A non-transitory computer storage medium having a computer program recorded therein for representing an amount of image color in a composite image, said computer program comprising:

code for generating at least one additional opacity channel for use in creating the composite image, the additional opacity channel initially set to fully opaque to represent that all of the image color is visible;

code for compositing at least one partially transparent graphical object having object color and object opacity, with an image having image opacity and the image color, to create the composite image, the composite image having composite image color and composite image opacity, the composite image color and composite image opacity being derived from one or more of the object color, the object opacity, the image color and the image opacity; and code for compositing the object opacity with the additional opacity channel to update the additional opacity channel, the updated additional opacity channel thereby being less than fully opaque representing an amount of the image color remaining in the composite image following the compositing of the at least one graphical object with the image.

24. A non-transitory computer storage medium having a computer program recorded therein for representing an amount of image color in a composite image, said computer program comprising:

code for generating at least one additional opacity channel for use in creating the composite image, the additional opacity channel initially set to fully opaque to represent that all of the image color is visible;

code for compositing at least one partially transparent graphical object having object color and object opacity, with an image having image opacity and the image color, to create the composite image, the composite image having composite image color and composite image opacity, the composite image color and composite image opacity being derived from one or more of the object color, the object opacity, the image color and the image opacity;

code for compositing the object opacity with the additional opacity channel to update the additional opacity channel, the updated additional opacity channel thereby being less than fully opaque and representing an amount of the original image color remaining in the composite image following the compositing of the at least one graphical object with the image; and code for utilizing the updated additional opacity channel to remove the remaining image color in the composite image.

* * * * *